United States Patent
Trask

(10) Patent No.: US 6,549,303 B1
(45) Date of Patent: Apr. 15, 2003

(54) TRAPPING METHODS AND ARRANGEMENTS FOR USE IN PRINTING COLOR IMAGES

(75) Inventor: Jeffrey L. Trask, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/399,589

(22) Filed: Sep. 20, 1999

(51) Int. Cl.[7] .................. G06F 15/00; G03F 3/08; G06K 9/40
(52) U.S. Cl. ................. 358/1.9; 358/518; 382/266
(58) Field of Search ............. 358/1.9, 1.8, 1.1, 358/1.3, 3.1, 3.15, 3.21, 1.16, 1.17, 518, 515, 520, 527, 535, 532; 382/167, 163, 164, 266, 270, 274, 275

(56) References Cited

U.S. PATENT DOCUMENTS 5,542,052 A * 7/1996 Deutsch et al. ............. 395/131
5,581,667 A * 12/1996 Bloomberg ................. 395/109
5,619,242 A * 4/1997 Haneda et al. .............. 347/131
6,031,544 A * 2/2000 Yhann ........................ 345/434
6,345,117 B2 * 2/2002 Klassen ...................... 382/167
6,377,711 B1 * 4/2002 Morgana .................... 382/274

* cited by examiner

Primary Examiner—Madeleine Nguyen

(57) ABSTRACT

Methods and arrangements are provided to apply trapping techniques to print image data prior to printing. The trapping techniques employ a trapping process that is designed to detect edges between different color regions that are susceptible to gap/halo formation due to registration errors. The trapping process selectively modifies the print image data associated with the color regions near the edge to provide an overlap of color planes that significantly reduces the potential for gap/halo formation in the subsequently printed image. The trapping process buffers an array of print image data, categorizes the print image data in the array by color, detects if an edge exists in the array based on the categorized colors, and selectively modifies print image data associated with the edge based on neighboring print image data. The modified print image data can then be used to print out the image.

14 Claims, 13 Drawing Sheets

TRAPPING METHODS AND ARRANGEMENTS FOR USE IN PRINTING COLOR IMAGES

TECHNICAL FIELD

The present invention is related to color image printing, and more particularly to trapping methods and arrangements that reduce the potential for unwanted image defects due to mechanical registration errors in multiple-stage color image printing systems.

BACKGROUND

Multiple-stage color image printers, such as, for example, conventional color laser printers, operate by transferring several image planes to paper in stages. Each image plane is printed with a different color ink (toner). For example, a four-stage color printer typically applies cyan (C), magenta (M), yellow (Y), and black (K) image planes during separate stages. These image planes can be created using a single drum for 4-pass printers, or one four drums for in-line printers. The image planes can be transferred to an intermediate drum or belt, and then to the paper, or directly to the paper with four transfers. Since the four image planes are created in four separate mechanical operations, it is difficult to perfectly align the four image planes on the paper so that no gaps and/or halos appear between and or near color edges. Gaps of only two 600 dpi pixels, for example, can form visible white lines in the printed image. Mechanical alignment of the image planes to an accuracy of better than $\frac{1}{1000}$ inch is required to eliminate such registration errors. Unfortunately, providing this level of mechanical accuracy tends to be very difficult and expensive.

Thus, for most printers, gap/halo formation problems due to registration errors are not directly addressed, but are instead left for the user/application to solve.

Trapping is the process of intentionally overlapping color edges so that small registration errors do not create gaps/halos. Trapping is commonly used in offset printing. However, this type of trapping is typically done by skilled graphics artists using special professional printing applications in the course of building up each printed image. In the more common desktop publishing setting, such valuable resources are scarce.

Thus, there is a need for automated methods and arrangements that can be used to provide advanced trapping techniques without requiring the user to provide specialized printing skills and/or other advanced trapping solutions. Preferably, the methods and arrangements will automatically operate in the background printing process in an efficient manner and without significant input from the user. The methods and arrangements should also be configured to provide trapping for color images generated by or otherwise provided through a variety of different desktop publishing, drafting, drawing, and other like applications/tools.

SUMMARY

The present invention provides automated methods and arrangements that employ advanced trapping techniques to modify print image data prior to printing. The trapping techniques of the various methods and arrangements are configured to operate without significant user inputs and can be readily applied to all types of printable images regardless of origin. The trapping techniques employ a trapping process that is designed to detect edges between different color regions that are susceptible to gap/halo formation due to registration errors. Once detected, the trapping process selectively modifies the print image data associated with the color regions near the edge to provide an overlap of color planes that significantly reduces the potential for gap/halo formation in the subsequently printed image.

Thus, in accordance with certain aspects of the present invention, the above stated needs and others are met by a method that includes buffering at least one array of print image data that is associated with a color image. The color image includes a first color region and an adjacent second color region with at least one edge formed there between. The method further includes categorizing at least a portion of the array by color, detecting the edge based on the categorized colors, and selectively modifying the print image data in the first color region located near the edge to provide trapping, based on print image data in the second color region that is also located near the edge. The method can also include printing the modified print image data in the first color region to a print media using at least one ink. This method can be repeated for each applicable print image data in each of a plurality of color plane printing stages.

In this manner, for example, when the second color region is significantly lighter in tone than the first color region, then the color in the second color region can be pulled over the edge and trapped under the color in the first color region. If the first and second color regions are close in tone to one another, then both colors can be pulled over the edge and trapped under the other. If the second color region is significantly darker in tone than the first color region, then first color region can be pulled over the edge and trapped under the color in the second color region.

An apparatus is also provided, in accordance with certain aspects of the present invention. The apparatus includes a converting unit that is configured to receive color image data and output corresponding print image data. The print image data is provided to a trapping unit that is configured to selectively modify and output portions of the print image data associated with a portion of a first color region located near an edge with a second color region, based on print image data associated with a portion of the second color region located near the edge. The apparatus further includes a printing unit that is configured to selectively apply ink to a print media based on the modified print image data. The apparatus can be embodied in hardware, software, firmware, and/or any combination thereof.

In accordance with still further aspects of the present invention, a system is provided that includes at least one computer, or like device, and a color printer. The computer is configured to output color image data that defines a first color region and an adjacent second color region. The color printer, which is connected to the computer, is configured to receive the color image data and output a corresponding printed image that depicts the first color region and the second color region and at least one visible edge formed there between. Trapping of colors near the edge is provided within the color printer by a trapping unit similar to that in the apparatus described above. As such, trapping techniques can be automatically considered and where appropriate applied to the print image data, regardless of the type of originating application in the computer or like device. Furthermore, a plurality of computers can benefit by a single embodiment of the trapping process within a shared color printer.

BRIEF DESCRIPTION OF THE DRAWINGS

A more complete understanding of the various methods and arrangements of the present invention may be had by reference to the following detailed description when taken in conjunction with the accompanying drawings, in accordance with certain exemplary implementations of the present invention, wherein.

DETAILED DESCRIPTION

Figure 1:
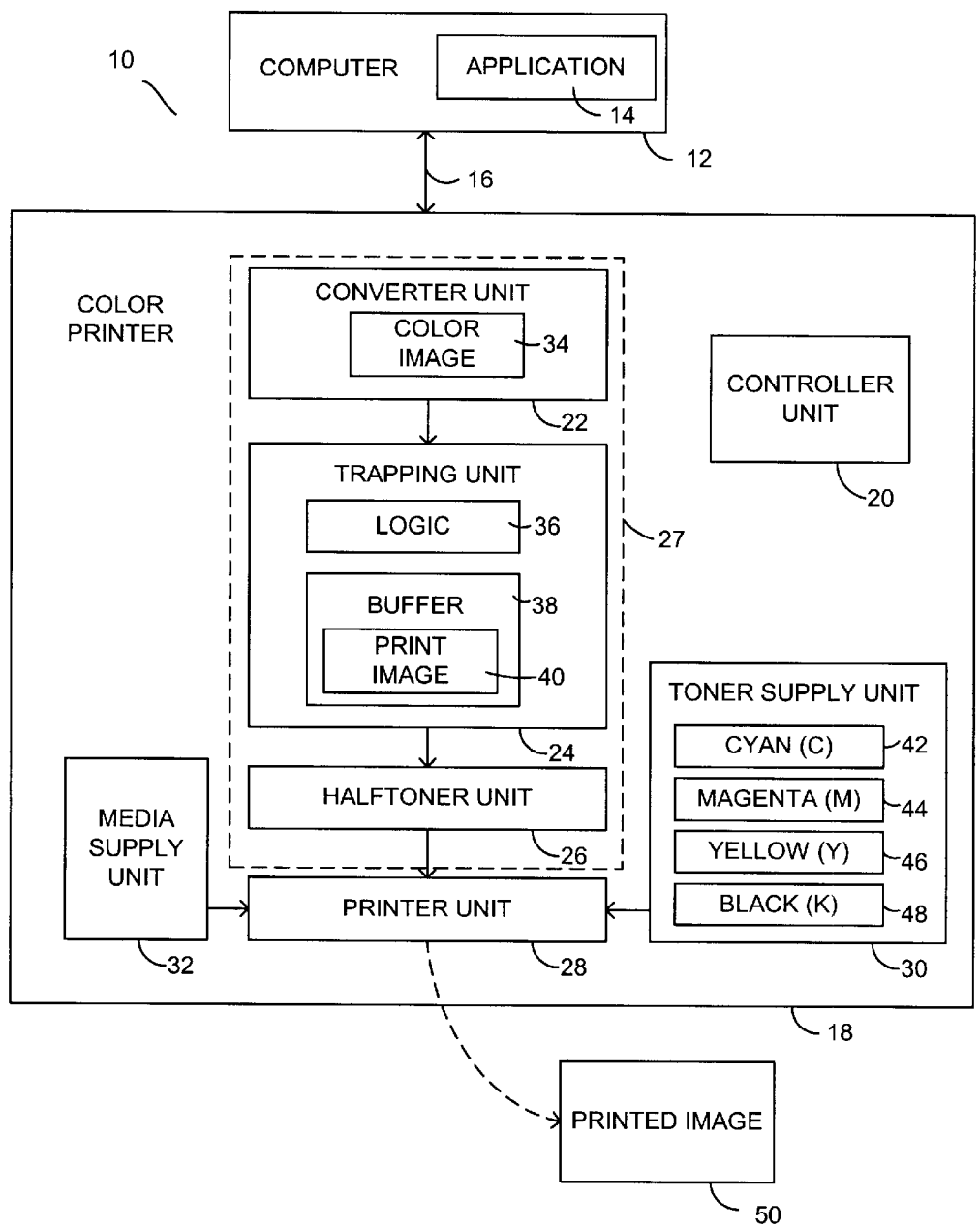
FIG. 1 is a block diagram depicting a color image printing system.

FIG. 1 is a block diagram depicting an exemplary image printing system 10, having at least one computer 12 coupled to at least one color printer 18. Computer 12 can include, for example, a personal computer (PC), workstation, server, mainframe, image copier, image scanner, video camera, or other like device. Computer 12 operates in accordance with instructions associated with at least one application 14 that causes computer 12 to output data representing a color image suitable for subsequent formatting/use by a color printer.

Application 14 is typically provided in a conventional data storage device (not shown) that is read or otherwise accessed by computer 12. When running, all or part of the instructions associated with application 14 are resident within a memory (not shown) in computer 12. As used herein, application 14 represents one or more sets of software instructions and can include operating system instructions, user application instructions, communication instructions, peripheral driver instructions, and any other instructions required to operate computer 12 within image printing system 10.

A color image typically includes some combination of text, graphics (e.g., objects) and/or raster data. For example, the color image data output by computer 12 and application 14 can include red-green-blue (RGB) image data that represents objects and text as defined by conventional desktop publishing techniques and/or tools and configured for transmission to one or more printing resources.

In this example, computer 12 is connected to color printer 18 through a data communications link 16. Data communications link 16 includes the requisite communication resources to transport image data and control data between computer 12 and color printer 18. For example, link 16 can include one or more interface connections, local area networks (LANs), wide area networks (WANs), intranets, the Internet, or other like communication services/systems.

Color printer 18 includes at least one controller 20 that is configured to control the operations associated with various subsystems/units therein during the printing of color images to a print media. In this example, color printer 18 further includes a converter unit 22, a trapping unit 24, a halftoner unit 26, a printer unit 28, a toner (ink) supply unit 30, and a print media supply unit 32.

Although described separately in this description, it should be understood that units 22, 24 and/or 26 could be combined into a single formatter unit 27, for example, which is embodied in a single circuit/chip/program. As described in the exemplary implementations that follow, however, trapping unit 24 provides the majority of features in the trapping process and therefore could just as easily stand alone with respect to units 22 and 26. Furthermore, it should also be understood that color printer 18 can be a color laser printer, or any other applicable multiple-stage printer and/or photocopier type of unit.

Color image data 34 is received from computer 12, over link 16, and provided to converter unit 22. Color image data 34 can include RGB or other types of image data, for example. Converter unit 22 is configured to convert color image data 34 into corresponding print image data that is output to trapping unit 24. The print image data can include, for example, CMYK print image data. The conversion of RGB image data to CMYK print image data, for example, is well known, and typically includes the use of a predefined color conversion table (not shown).

In accordance with certain exemplary implementations of the present invention, the print image data output by converter 22 includes 8-bits of data for each ink color (i.e., cyan (C), magenta (M), yellow (Y), and black (K)), for each pixel in the corresponding color image. Thus, 32-bits of print image data are used to defamed the overall color of each pixel in the print image. The print image data output by converter 22 can also include additional data, such as, for example, data identifying the object type (e.g., background, text, graphics, or raster data) associated with each color pixel in the image to be printed.

As shown in this example, trapping unit 24 includes logic 36 and buffer 38. Logic 36 and buffer 38 can be embodied within an application-specific integrated circuit (ASIC) and are configured to implement a trapping process as described herein using print image data 40 as initially output by converter unit 22 and stored in buffer 38. As such, buffer 38 preferably includes a random access memory (RAM) or the like that is configured to be accessed by logic 36. Trapping unit 24 can be configured or otherwise enabled/disabled, for example, via computer 12 and application 14, controller 20, and/or other user inputs at computer 12 or color printer 18.

Trapping unit 24 is configured to selectively analyze print image data 40 to determine if trapping techniques should be employed to reduce the potential for forming gaps (e.g., white gaps) and/or causing other visual distractions (e.g., halo effects) in the printed image due to potential small registration errors in the mechanics of color printer 18.

Although described herein with respect to the exemplary arrangement depicted in FIG. 1, it should be understood that trapping unit 24 could include any combination of hardware, software, and/or firmware. For example, those skilled in the art will recognize that a purely software-based configuration may be employed if provided the requisite processing services of an associated processor (not shown) and memory. In such a configuration, the processor would be configured to operate in accordance with software instructions that implement all or part of the trapping process described herein. In certain configurations, for example, controller 20 may be adapted to accomplish, or assist with, such a processing task. Furthermore, the instructions associated with the trapping process can be provided to color printer 18 via any applicable computer readable media, such as, for example, a magnetically-read media, an optically read media, a solid state logic or memory device, a transmitted signal, or the like.

Print image data 40 is output by trapping unit 24 to halftoner unit 26. Halftoner unit 26 allows for selective half-toning of pixels in print image data 40. In one implementation of the present invention, halftoner unit 26 is selectively controlled by setting a halftone indicator (e.g., a flag bit) within the object type identifier data portion of print image data 40.

Printer unit 28 is configured to receive the resulting print image data as output by halftoner unit 26. Printer unit 28 uses the information contained in the received print image data to selectively apply an appropriate amount of ink, such as, for example, cyan (C) ink 42, magenta (M) ink 44, yellow (Y) ink 46, or black (K) ink 48, to a print media to form a corresponding plane of printed image 50. As depicted, toner supply unit 30 provides the various inks to laser print unit 26. Although depicted as using C, M, Y, and K inks, it should be apparent that color printer 18 could also be configured for use with other combinations of inks. By way of example, color printer 18 can be configured to support different "n-ink" printing processes, wherein n≧2.

Print media supply unit 32 provides the print media (e.g., paper, plastic, transparency, etc.) to printer unit 28. As described above, registration errors during the application of the various inks to an intermediate carrier (not shown) and/or the printed media often occur within printer unit 28. A further description of the operation and arrangement of printer unit 28 is outside of the scope of this description for the present invention, since this part of the art is so well known and understood by those skilled therein.

Figure 2:
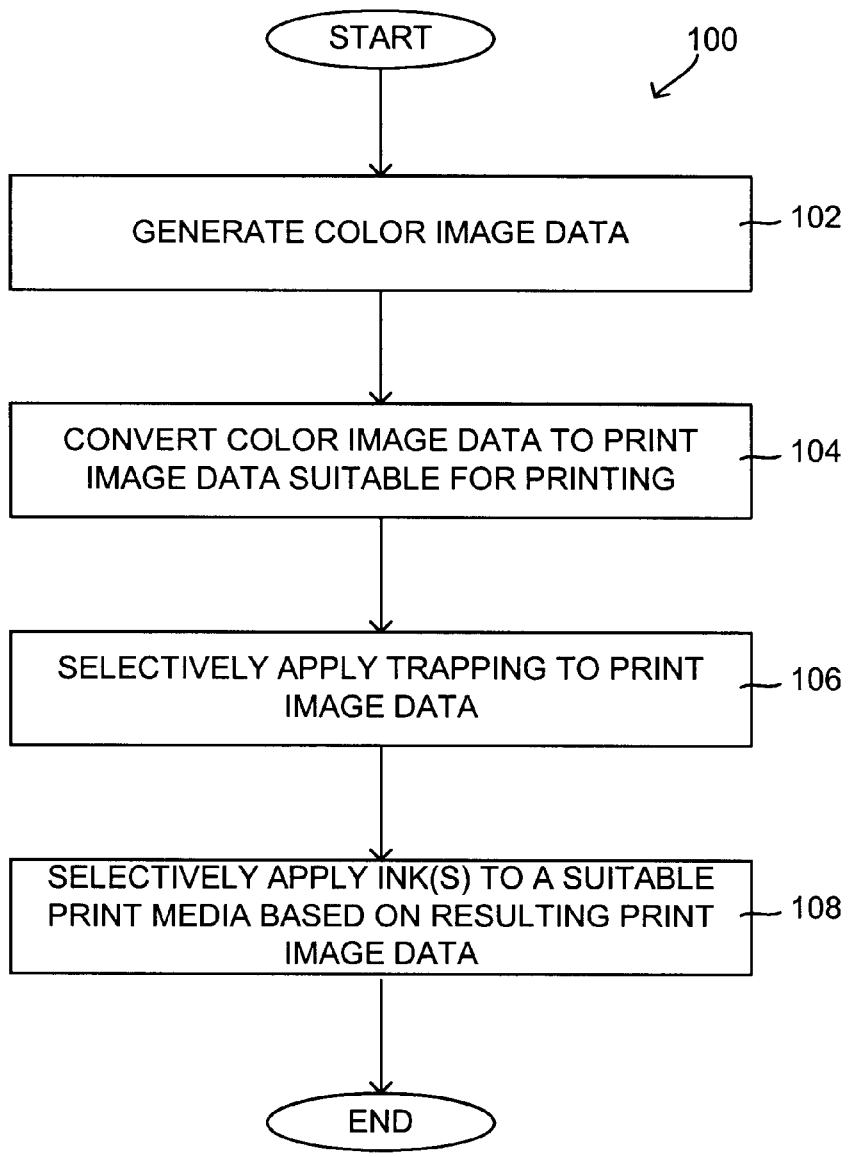
FIG. 2 is a flow-chart depicting a process for printing a color image, for example, using the color image printing system of FIG. 1.

FIG. 2 is a flow-chart depicting a printing process 100 implemented by image printing system 10. The steps are described with additional reference to FIG. 1. In step 102, color image data is generated, for example, using computer 12 and application 14. The color image data can be RGB data defining objects within the image to be printed by color printer 18, for example. Next, in step 104, the color image data is converted to corresponding print image data that is suitable for printing. For example, RGB data generated in step 102 can be converted to CMYK print image data in step 104.

In step 106, trapping techniques are selectively applied to the print image data. For example, a trapping process can be applied to the CMYK print image data using trapping unit 24. In step 108, ink is selectively applied to a print media based on the value of the pixel data from step 106. In the above a.example, either C ink 42, M ink 44, Y ink 46, and/or K ink 48 is selectively applied to a print media (or intermediate surface) using printer unit 28 in step 108.

As depicted in FIG. 2, automated trapping techniques are performed on print image data rather than on color or object data. In the past, automated trapping techniques have been applied, for example, by application 14 to object data in generating the color image data. For example, CorelDRAW™ allows users to enable/disable trapping for objects. When enabled, this trapping extends the outlines of objects outward by some amount. While this prevents some gap formation near an objects border, it does not necessarily prevent gaps from forming within the objects themselves. Furthermore, having such broad coverage, such trapping techniques can lead to over correction in certain instances. For example, this trapping technique increases the width of characters and as such can make the characters appear bold at times, depending upon the background color.

To the contrary, the present invention provides trapping techniques that can be efficiently applied to the print image data within the printer. As such, the trapping process that is employed is configured to be more selective by focusing on a subset of the print image data to determine if and how much trapping should be performed to significantly reduce the potential for gap formation and/or the formation of other halo type effects in the printed image due to registration errors in printer unit 28.

Figure 3:
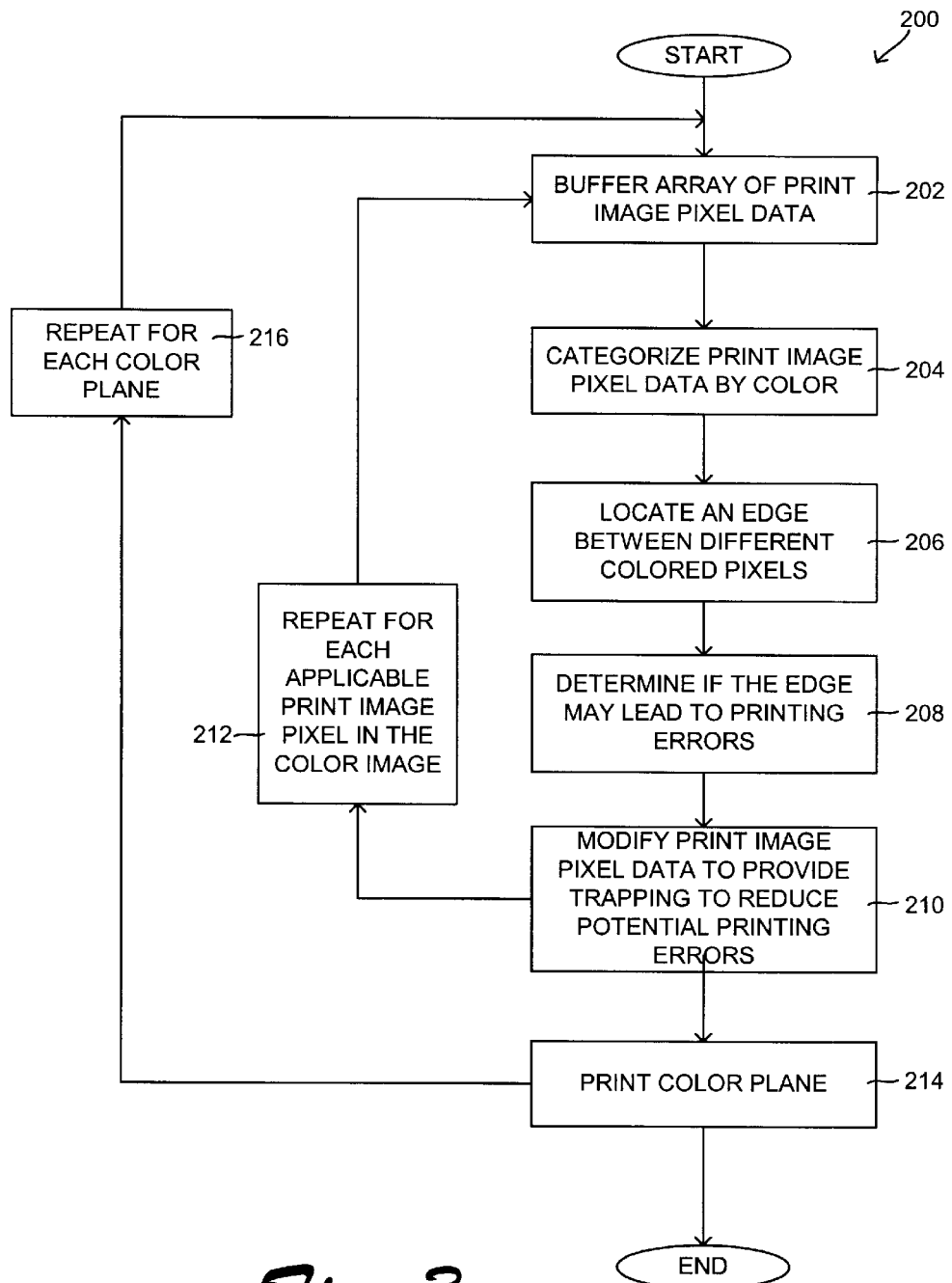
FIG. 3 is a flow-chart depicting a trapping process for use in printing a color image, for example, using the color image printing system of FIG. 1.

With this in mind, FIG. 3 is a flow-chart depicting a trapping process 200 in accordance with certain preferred implementations of the present invention. Trapping process 200 can be embodied, for example, in trapping unit 24 of FIG. 1 and/or one or more steps of printing process 100 of FIG. 2.

In step 202, an array of print image pixel data is buffered during the first printing stage. For example, a plurality of CMYK print image data associated with a selected pixel and a certain number of neighboring pixels can be buffered during the yellow (Y) printing stage. Next, in step 204, the buffered print image pixels are categorized by color. Here, all or part of the available print image data can be used to separate the buffered print image pixels into different color groups.

In step 206, it is determined if an edge is located between different colored pixel groups based on the categorized color of the buffered print image pixels. Therefore, it can be determined if, for example, the selected pixel is near an edge as defined by the color categorization performed in step 204. In step 208, it is determined if the edge may lead to printing errors, such as, for example, gaps and/or halo type effects due to small registration errors between printed planes.

In step 210, the print image pixel data is selectively modified to provide trapping that tends to reduce the potential for printing errors based on the edge determinations in steps 206 and 208. Thus, for example, a C, M, Y, and/or K print image pixel data value for the selected pixel may be modified depending upon the printing stage (i.e., yellow (Y) pixel data would be modified during the yellow plane printing stage, magenta (M) pixel data would be modified during the magenta plane printing stage, etc.).

A recursive step 212 is provided such that steps 202 through 210 are repeated for each applicable pixel in an image. In accordance with step 214, once all applicable pixels have been subjected to steps 202 through 210, then the color plane can be printed. Step 216 adds another recursive step to process 200 that causes steps 202 through 210 to be repeated as necessary for each color plane printing stage. In this example, process 200 is configured to analyze the un-modified value of the neighboring print image data during recursive steps.

An exemplary trapping process will now be described in greater detail beginning with reference to the graphical depiction of print image pixels in FIG. 4.

The following embodiment of the trapping process is configured for use with 8-bit CMYK image data and a color laser printer having a resolution of 600 dpi, in accordance with certain exemplary aspects of the present invention. Nevertheless, those skilled in the art will recognize that the techniques employed in the exemplary trapping process can be scaled, adjusted and/or otherwise modified for use with other lower or higher resolution image data and/or other types of color printers. By way of example, the number of pixels analyzed, or the number of the logical/mathematical rules/steps that are employed, can be increased or decreased as needed for a particular image printing system.

Figure 4:
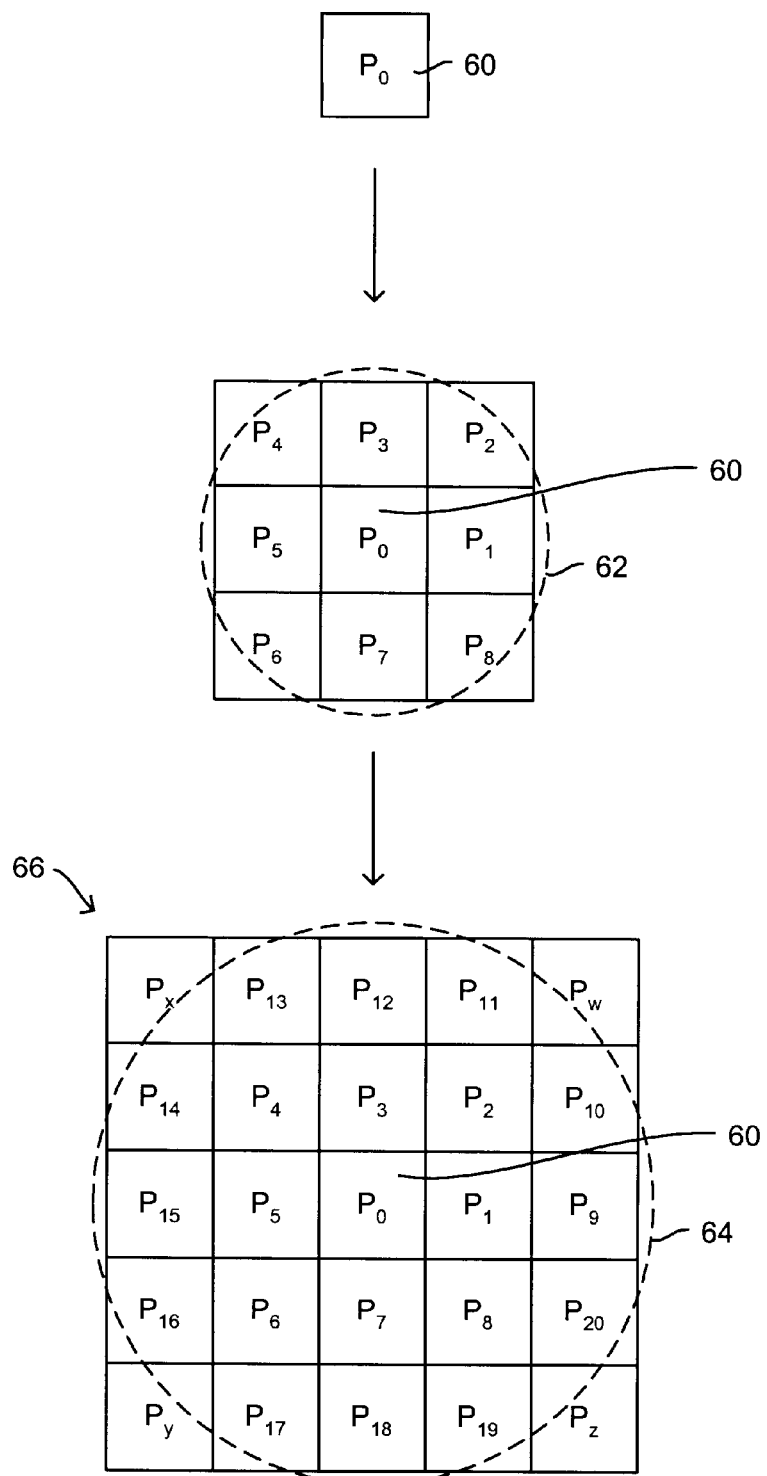
FIG. 4 is a block diagram depicting a plurality of color image pixels arranged in an array of pixels.

To allow for at least two pixels of trapping capability, the trapping process operates on a "5×5" print image pixel array 66, as depicted in FIG. 4. Pixel array 66 includes an inner ring 62 having eight print image pixels ($P_1$–$P_8$), each being adjacent to a selected pixel 60 ($P_0$) that is to be analyzed and possibly modified. Pixel array 66 further includes an outer ring 64 that provides an additional twelve print image pixels ($P_9$–$P_{20}$), each of which are juxtaposed to one of the print image pixels of inner ring 64. Note that print image pixels ($P_W$–$P_Z$) located at the corners of the print image pixel array 66 are not considered by this exemplary embodiment of the trapping process.

Consequently, the trapping process considers twenty-one pixels (i.e., $P_0$–$P_{20}$) of Print image data 40 at a time to determine if up to about two pixels of trapping is desirable with respect to the color (tone) of selected pixel 60 based on the color of the neighboring print image pixels within inner ring 62 and outer ring 64.

To accomplish this task for the entire image, the trapping process selectively considers each of the print image pixels represented within print image data 40. To accomplish this, dummy print image data (e.g., white pixel data) is provided for within the trapping process to take the place of the nonexistent neighboring pixels within inner ring 62 and/or outer ring 64, as for example, would be necessary for selected pixels within two pixels of an image's border.

Figure 5:
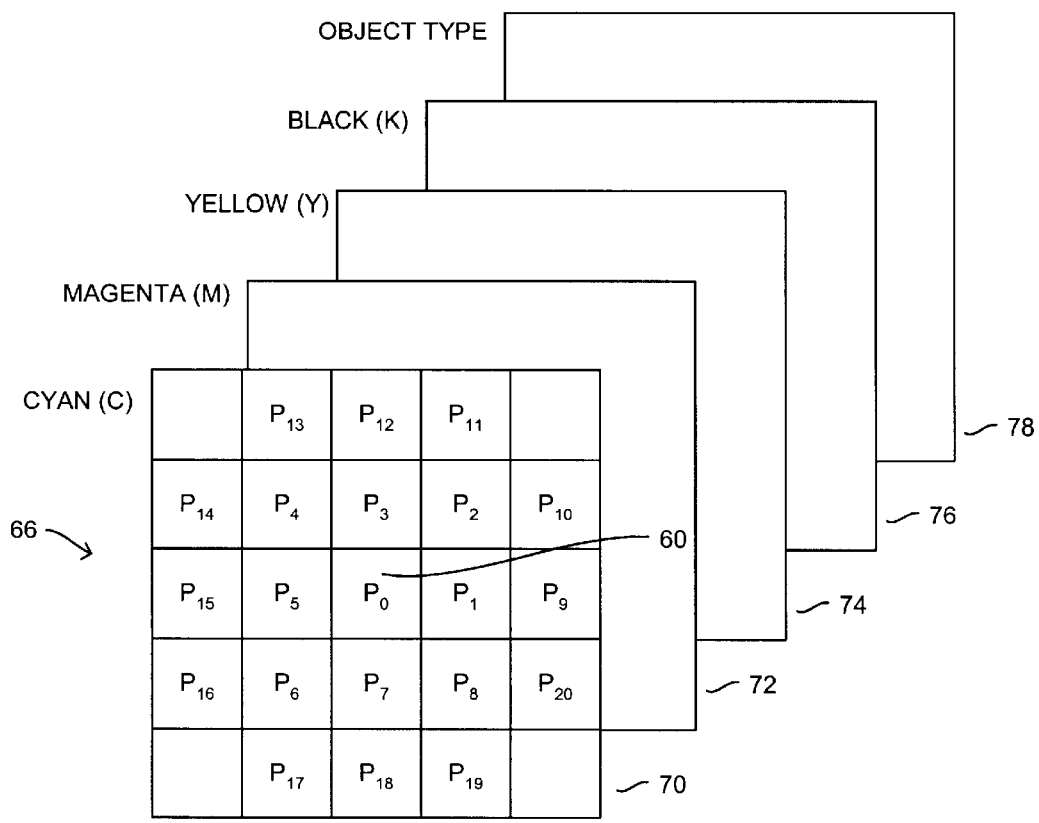
FIG. 5 is a block diagram depicting a plurality of pixel data associated with the array of pixels in FIG. 4.

As shown in the graphical depiction of FIG. 5, associated with print image pixel array 66 there is a corresponding cyan (C) data value array 70, magenta (M) data value array 72, yellow (Y) data value array 74, black (K) data value array 76, and object type identifier array 78. In this example, each of the color arrays includes 8-bits of data for each print image pixel therein that defines the amount of ink (toner) to be applied to a corresponding area or region on the print media. Thus, for example, the amount of a particular color of toner can be defined at levels 0–255, when all 8-bits are used. Here, a 255 value represents 100% of a particular color of ink.

Object type identifier array 78 includes "n" number of bits of data for each pixel therein, depending upon the needs of color printer 18. In one implementation of the present invention, for example, object type identifier array 78 includes 2-bits of data (i.e., n=2) for each pixel that identify the object type represented by the pixel as being either background, text, graphics, or raster data. The object type identifier is used by halftoner unit 26, subsequent to trapping unit 24, to determine the amount/type of half toning to be used for each pixel. For example, since halftones tend to make edges rougher, a lower resolution halftone may be desirable for graphics and raster data because of area fill uniformity/boundary, while a higher resolution halftone may be desirable for text data.

Since color printer 18 prints each of the four colors (i.e., C, M, Y, and K) in stages (or planes), the trapping process is run during each stage using print image data selected from C data value array 70, M data value array 72, Y data value array 74, and K data value array 76. Thus, a full implementation of the trapping process would likely utilize all 32-bits of color data (and the when applicable, n=bits of object type identifier data) available for each pixel in pixel array 66, during each color printing stage.

Due to implementation cost considerations with regard to buffer 38, however, certain preferred implementations of the trapping process, and in particular those that utilize ASIC or other solid state chip technology, need only analyze selected portions of print image data 40 during each stage. As such, the size of buffer 38 is essentially minimized by taking into account that only certain combinations/levels of inks will produce noticeable gaps and other defects.

For example, when analyzing the potential need for trapping during the cyan printing stage, the trapping process utilizes all 8-bits of the cyan (C) pixel data, but only the five most significant bits of the 8-bit magenta (M) pixel data and the five most significant bits of the 8-bit black (K) pixel data. None of the 8-bits of yellow (Y) pixel data need be considered, since yellow is so light a color compared to the other three. Thus, the M and K pixel data are each truncated to 5-bits and the Y pixel data is not used during the cyan printing stage. As a result, buffer 38, in this example, only requires 18+n bits of data for each print image pixel rather than 32+n bits of data. This significantly reduces the size of buffer 38.

Similarly, during the magenta printing stage, all 8-bits of the magenta (M) pixel data are utilized and the 8-bits of cyan (C) pixel data and 8-bits of black (K) pixel data are each truncated to 5-bits of data. During the black printing stage, all 8-bits of the black (K) pixel data are utilized along with 5-bit truncated cyan (C) and magenta (M) pixel data. Again, because yellow is so light a color, the yellow (Y) pixel data as not considered when analyzing magenta (M) or black (K) pixel data.

Two truncation options are available during the yellow printing stage, either the magenta (M) pixel data or the cyan (C) pixel data can be truncated and considered along with all 8-bits of the yellow (Y) pixel data and a truncated 5-bits of black (K) pixel data. In certain implementations, the choice to consider M or C pixel depends upon their relative values, such that the color with the highest value is selected. For example, if the C pixel data value equals "120" and the M pixel data value equals "54", then the trapping process would utilize the higher value C pixel data. In certain implementations, it was determined, however, that simply selecting the magenta (M) pixel data would be sufficient.

The following list illustrates the truncation or reduced data set utilized during each stage of printing as described in the example above:

Cyan: C: 8, M:5, K:5

Magenta: M: 8, C:5, K:5

Yellow: Y: 8, maxCM:5, K:5
  wherein, "maxCM"=maximum value of C, or M Or (optionally) Y: 8, M:5, K:5

Black: K: 8, M:5, C:5

In accordance with certain further aspects of the present invention, the object type identifier data (n-bits) can also be used by the trapping process to determine if trapping is appropriate. Thus, the trapping process can be configured by application 14, for example, to enable/disable trapping based on the object type identifier data associated with selected pixel 60.

Regardless of whether the object type data is used by the trapping process, the trapping process can be configured, if needed, to pass the object type identifier data onto halftoner unit 26 (if present) for each print image pixel.

After buffering the CMYK image data, for example, as described above and depicted in FIG. 5, the next step in the trapping process is to categorize the color of the print image pixels. This step is graphically depicted in FIG. 6A and FIG. 6B, wherein pixel array 66 is illustrated with an overlay of different colored regions associated, for example, with different objects or portions thereof within the color image.

Figure 6A:
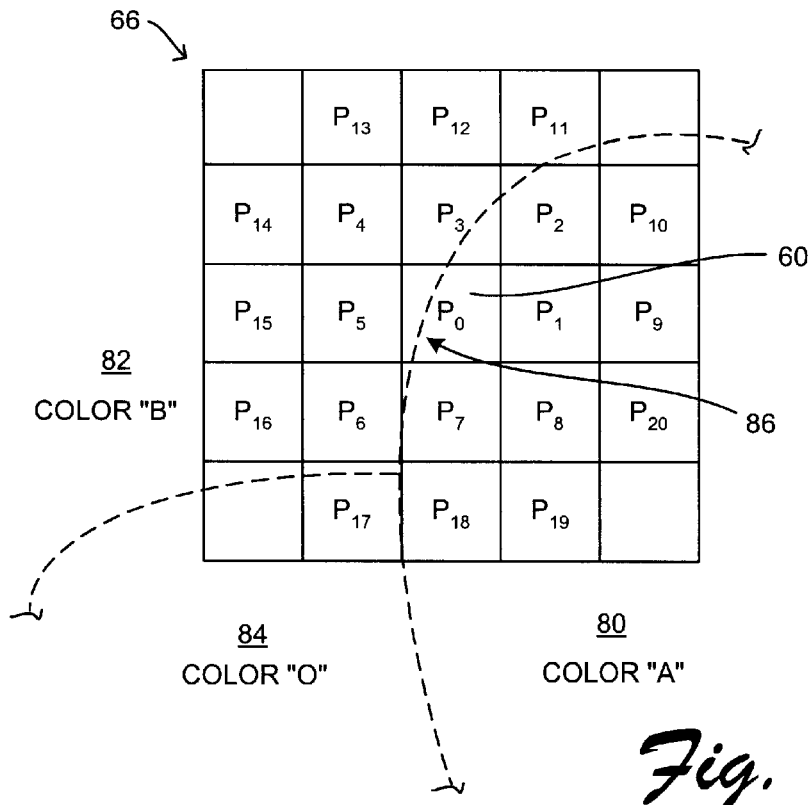
FIG. 6A is a block diagram depicting a plurality of pixel data as in FIG. 5 and related colored objects.
Figure 6B:
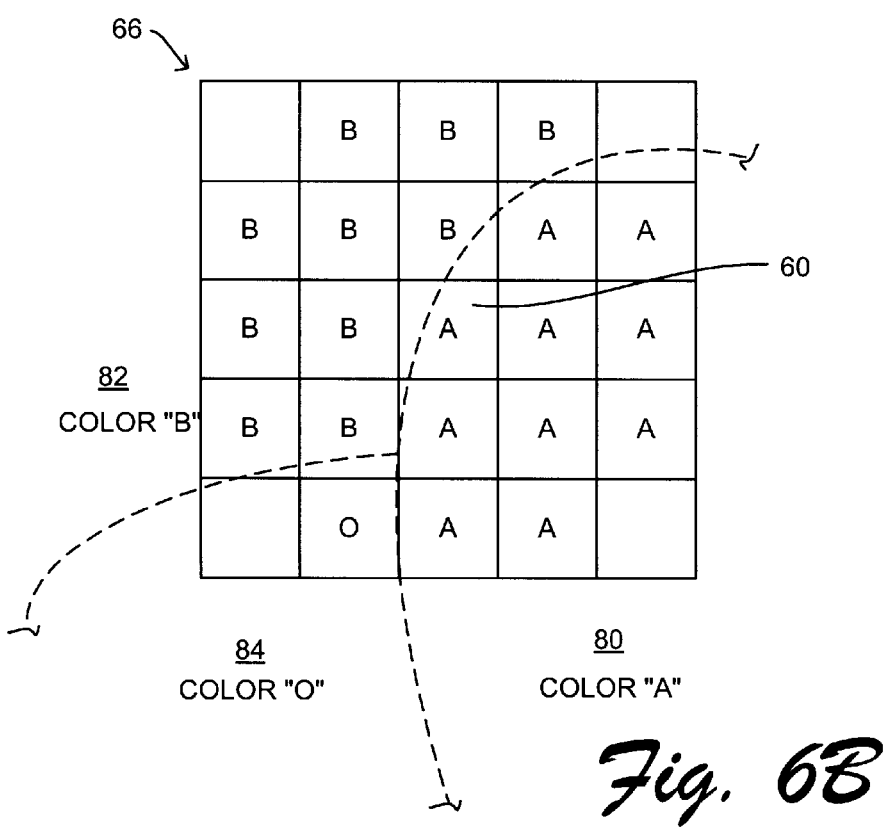
FIG. 6B is a block diagram depicting a color categorization of the plurality of pixel data of FIG. 6A.

As shown in FIG. 6A, a first region 80 having color "A" is formed, a second region 82 having color "B" is formed and a third region 84 having color "O" is formed. There is an edge 86 between colors A and B, in this example that will be considered for trapping later on. In FIG. 6B, the corresponding CMYK pixel data values for each of the pixels within pixel array 66 have been categorized as being either color "A", color "B", or color "O".

The color categorization was accomplished by first setting the value of selected pixel ($P_0$) 60 to represent color A. Next, the trapping process begins examining each pixel (i.e., $P_i$, wherein i=1 through 20) in order. If the value of the next $P_i$ is within a defined range of color A, for example, based on a first tolerance (ATOL) value and/or a second tolerance (BTOL) value then the print image pixel is considered a color A pixel. For example, referring to the overlay in 6A pixels $P_{1-2}$ would each be categorized as color A pixels.

The next pixel to be examined is pixel $P_3$. Since pixel $P_3$ in this example is within second region 82, it will not be within a required tolerance range (e.g., based on ATOL and BTOL) of the value of selected pixel 60. As such, pixel $P_3$ is categorized as a color B pixel and its value defines the color B. The first tolerance (ATOL) value and/or the second tolerance (BTOL) value are further used to define the range of pixel values that are to be categorized as color B.

The trapping process continues categorizing the remaining applicable print image pixels in print image pixel array 66 as being either color A or color B pixels, in this manner. For example, pixels $P_{4-6}$ are also categorized as color B pixels, pixels $P_{7-10}$ are categorized as color A pixels, and pixels $P_{11-16}$ are categorized as color B pixels.

Since pixel $P_{17}$ is within third color region 84 it will not be within the tolerance (e.g., based on ATOLABTOL) of the value of selected pixel ($P_0$) 60, or of pixel $P_3$. As such, pixel $P_{17}$ is categorized as a color O pixel; "O" meaning "other". Hence, any other print image pixels that cannot be categorized as color A or B will also be categorized as color O pixels. However, in this example, the remaining pixels $P_{18-20}$ are categorized as color A pixels.

In certain implementations, these categorizing rules can be modified for special cases, for example, wherein the black (K) pixel data value is relatively high. Here, BTOL can be a determined by a function that selects the maximum value of either ATOL or a "black (K) tolerance" (KTOL) value.

Figure 9:
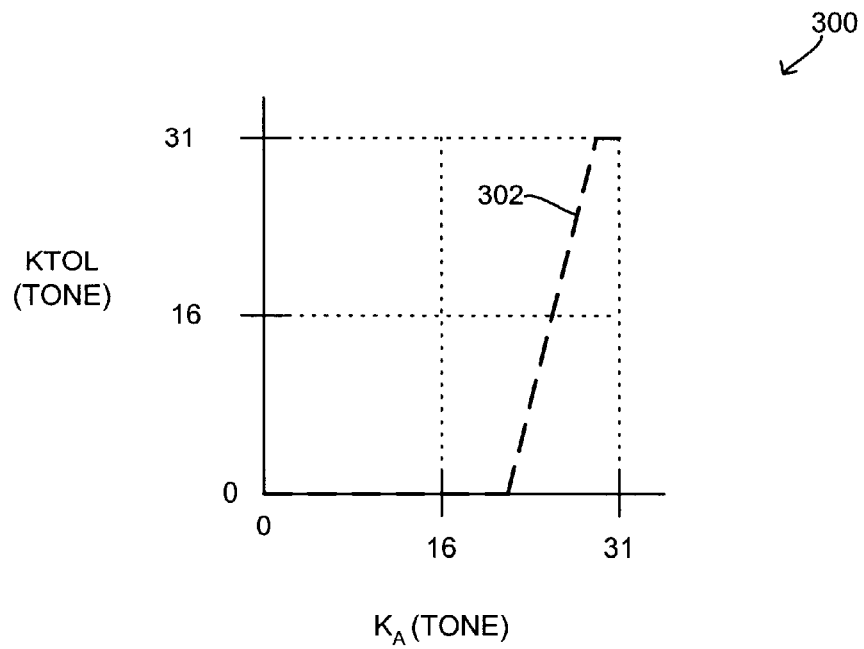
FIG. 9 is a graph depicting a function for determining a value for a KTOL parameter for use in a trapping process.

By way of example, FIG. 9 depicts a graph 300 that can be used to set/determine KTOL based on the value of the K pixel data value ($K_A$) of selected pixel 60. The x-axis of graph 300 depicts the tone of a 5-bit truncated value of the K pixel data value of selected pixel representing values 0 through 31. The y-axis of graph 300 depicts a similar value for KTOL. Line 302 is a plot of the function with respect to the x-axis and y-axis. As depicted by line 302, the value of KTOL begins to increase from 0 at about x=22. KTOL reaches a maximum of 31 at about x=30. Setting BTOL equal to KTOL allows for more colors to be categorized as color B near dark edges (e.g., black edges).

When considering yellow (Y) data and potential yellow halo effects, a yellow tolerance (YTOL) value could be used. Indeed, it is contemplated that there could be separate tolerance associated with each $n^{th}$ color ink.

In addition to categorizing the pixels within pixel array 66 by color, the trapping process further categorizes the pixels by object type (TO). Thus, for example, the object type identifier associated with selected pixel ($P_0$) 60 defines an $TO_A$ object type. Similarly, the object type identifier associated with the first B colored pixel (here, pixel $P_3$) define an $TO_B$ object type.

The following list defines rules for categorizing pixels by color, in accordance with certain exemplary aspects of the present invention:

A) Center pixel is color A ($C_A$, $M_A$, $Y_A$, $K_A$)

Object type A ($TO_A$)=object type of selected pixel 60.

B) Set tolerance levels.

$ATOL=3$ $BTOL=\max(ATOL, KTOL)$

C) Identify color A pixels:

$C_{Alo}=\max(C_A-BTOL, 0)$, $C_{Ahi}=\min(C_A+BTOL, 31)$ $M_{Alo}=\max(M_A-BTOL, 0)$, $M_{Ahi}=\min(M_A+BTOL, 31)$ $Y_{Alo}=\max(Y_A-BTOL, 0)$, $Y_{Ahi}=\min(Y_{Ahi}+BTOL, 31)$ $K_{Alo}=\max(K_A-BTOL, 0)$, $K_{Ahi}=\min(K_{Ahi}+BTOL, 31)$ IF ($C_{Alo}>31-2=BTOL$) THEN $C_{Alo}=31-2=BTOL$ IF ($C_{Ahi}<2 \times BTOL$) THEN $C_{Ahi}=2=BTOL$ IF ($M_{Alo}>31-2=BTOL$) THEN $M_{Alo}=31-2=BTOL$ IF ($M_{Ahi}<2=BTOL$) THEN $M_{Ahi}=2=BTOL$ IF ($Y_{Alo}>31-2=BTOL$) THEN $Y_{Alo}=31-2=BTOL$ IF ($Y_{Ahi}<2=BTOL$) THEN $Y_{Ahi}=2=BTOL$ IF ($K_{Alo}>31-2=ATOL$) THEN $K_{Alo}=31-2=ATOL$ IF ($K_{Ahi}<2=ATOL$) THEN $K_{Ahi}=2=ATOL$ $C_{Alo}<=C_i<=C_{Ahi}$ $M_{Alo}<=M_i<=M_{Ahi}$ $Y_{Alo}<=Y_i<=Y_{Ahi}$ $K_{Alo}<=K_i<=K_{Ahi}$ wherein, i=1 though 20

D) The first non-A colored pixel in inner ring 62 is defined as a color B pixel ($C_B$, $M_B$, $Y_B$, $K_B$),
   otherwise, the first non-A colored pixel in outer ring 64 is defined as a color B pixel($C_B$, $M_B$, $Y_B$, $K_B$), and object type B, $TO_B$, is defined as the object type of this color B pixel.

E) Identify more color B pixels:

$C_{Blo}$=max ($C_B$-BTOL, 0), $C_{Bhi}$=min ($C_B$+BTOL, 31)

$M_{Blo}$=max ($M_B$-BTOL, 0), $M_{Bhi}$=min ($M_B$+BTOL, 31)

$Y_{Blo}$=max ($Y_B$-BTOL, 0), $Y_{Bhi}$=min ($Y_B$+BTOL, 31)

$K_{Blo}$=max ($K_B$-BTOL, 0), $K_{Bhi}$=min ($K_B$+BTOL, 31)

IF ($C_{Blo}$>31-2=BTOL) THEN $C_{Blo}$=31-2=BTOL

IF ($C_{Bhi}$<2=BTOL) THEN $C_{Bhi}$=2=BTOL

IF ($M_{Blo}$>31-2=BTOL) THEN $M_{Blo}$=31-2=BTOL

IF ($M_{Bhi}$<2=BTOL) THEN $M_{Bhi}$=2=BTOL

IF ($Y_{Blo}$>31-2=BTOL) THEN $Y_{Blo}$=31-2=BTOL

IF ($Y_{Bhi}$<2=BTOL) THEN $Y_{Bhi}$=2=BTOL

IF ($K_{Blo}$>31-2=BTOL) THEN $K_{Blo}$=31-2=BTOL

IF ($K_{Bhi}$<2=BTOL) THEN $K_{Bhi}$=2=BTOL $C_{Blo}$<=$C_i$<=$C_{Bhi}$ $M_{Blo}$<=$M_i$<=$M_{Bhi}$ $Y_{Blo}$<=$Y_i$<=$Y_{Bhi}$ $K_{Blo}$<=$K_i$<=$K_{Bhi}$

F) All other pixels are color O pixels.

ATOL, BTOL and KTOL are each preferably programmable parameters that can be set, for example, by the trapping process and/or application 14.

Having categorized the print image pixels within print image pixel array 66 by color, if all of the print image pixels in print image pixel array 66 are color A pixels, then no trapping needs to be performed with respect to selected pixel 60. If there is at least one color B pixel within print image pixel array 66, then the trapping process begins the step of analyzing the number and location/relationship of color A, B and O pixels within print image pixel array 66. The statistical information that is gathered is used in subsequent steps of the trapping process to determine if an edge exists.

The following is a list of information gathered in this analysis step, in accordance with an exemplary implementation of the present invention:

A) Within inner ring 62 collect the following statistics:
   na3=number of color A pixels
   nb3=number of color B pixels
   no3=number of color O pixels
   nax3=number of color A pixels followed by color B or O pixels
   nbc3=number of color B pixels in $P_{1,3,5,7}$
   nia3=number of color A pixels not adjacent to a color A pixel in outer ring 64
   nib3=number of color B pixels not adjacent to a color B pixel in outer ring 64

B) Within outer ring 64 collect the following statistics:
   na5=number of color A pixels
   nb5=number of color B pixels
   no5=number of color O pixels
   nax5=number of color A pixels followed by color B or O pixels
   nbx5=number of color B pixels followed by color A or O pixels
   nox5=number of color O pixels followed by color A or B pixels
   nia5=number of color A pixels not preceded or followed by a color A pixel
   nib5=number of color B pixels not preceded or followed by a color B pixel The following is a list of the statistical/Boolean results for the exemplary pixel array of FIG. 6B, based on the above steps:

A) Within inner ring 62:
   na3=4
   nb3=4
   no3=0
   nax3=1
   nbc3=2
   nia3=0
   nib3=0

B) Within outer ring 64:
   na5=5
   nb5=6
   no5=1
   nax5=1
   nbx5=1
   nox5=1
   nia5=0
   nib5=0

The next step in the trapping process involves determining if selected pixel 60 is associated with an edge, such as, for example, edge 86 between first color region 80 and second color region 82 as depicted in FIG. 6A. Since an edge can exist in different positions about pixel array 66, an edge pixel type categorization is performed, for example, per the following list:

A) An "edge1" edge type is present IF:
   selected pixel 60 is at edge between color A and color B. This category of edge pixel type might lead to gap effects if not modified using the trapping process.

B) An "edge2" edge type is present IF:
   selected pixel 60 is one pixel from an edge between color A and color B. This category of edge pixel type might also lead to gap effects if not modified using the trapping process.

C) An "edgey" edge type is present IF:
   selected pixel 60 is at edge between color A and color B, however, this is a more restrictive case than edge1 and will be used when colors A and B indicate a saturated Red/Green color next to White. This category of edge type might lead to yellow halo effects if not modified using the trapping process. For example, when a Red (M ink+Y ink) character is printed on a White background, the Y ink may scatter outward from the edge of the character making it appear Orange rather than Red. The trapping process addresses this type of halo effect by essentially pulling the White background color inward by about one pixel in the Y plane under the character's edges. The "edgey" category is used to insure that the edge is wide enough to avoid accidentally eliminating all or most of the Y ink in thin Red lines, which would result in a thin Magenta line rather than a thin Red line.

One important part of determining if print image pixel array 66 has an edge therein, is to avoid applying trapping to print image pixels that are not at an actual edge, but are simply part of a non-edge pattern or tone in the image. This means, for example, that the relationship between selected pixel 60 and the remaining pixels in inner and outer rings 62 and 64, respectively, need to be studied to identify when the pixels are most likely arranged at an edge.

Thus, for example, logic can be applied to identify solid or broken lines or arcs of different colored pixels, presumably forming an edge. However, an alternating pattern of different colored pixels would not necessarily signify an edge and thus the logic would likely not consider such to be an edge. Additionally, logic can be applied to look for certain shapes or patterns (e.g., squares, circles, triangles, diamonds, diagonal lines, etc.) that may or may not signify that an edge is present.

The following exemplary logically steps illustrate one potential edge categorization technique using the statistical data collected earlier:

A) Selected pixel 60 has edge type of "edge1":
IF (na3>2 AND
nb3>1 AND
no3=0 AND
nax3 1 AND
nia3=0 AND
nib3=0 AND
[(na3>4 AND na5>1) OR (na3<=4 AND na5>2)] AND
[(na3>4 AND na5>1) OR (na3<=4 AND na5>2)] AND
no5<=3 AND
nax5<=2 AND
nbx5=nax5AND
nox5<=1 AND
nia 5=0 AND
nib5=0)

B) Selected pixel 60 has edge type of "edge2":
IF (na3>6 AND
no3=0 AND
nax3<=1 AND
nbc3=0 AND
na5>2 AND
nb5>2 AND
no5=0 AND
nax5=1)

C) Selected pixel 60 has edge type of "edgey":
IF (edge1 AND
na3+na5>9 AND
nb3+nb5>6 AND
no5=0 AND
nax5=1)

Applying this logic to print image pixel array 66 in FIG. 4B, selected pixel 60 in this example would be categorized as an edge type of "edge1" (i.e., edge1="1" or "true"). Thus, the trapping process has determined that selected pixel 60 is located at edge 86 between first color region 80 and second color region 82, as shown in FIG. 6A.

Once an applicable edge type has been detected, then the next step in the trapping process is to determine the approximate densities for color A, color B and a potential gap color (E) located near the identified edge.

As used herein, the term density is meant to refer to the approximate darkness characteristics of applied ink within the context of the printed image as they appear to the human eye. Converting or weighting the C, M, Y, and K pixel data values to corresponding approximate density values allows for comparisons between the resulting inks to take place. Thus, for example, a 100% black (K) area will naturally appear darker (i.e., denser) than would a 100% cyan (C) area or a 100% magenta (M) area, even though the pixel data values for each of these is the same (e.g.,=255 for 8-bits of data, or on a scale of 0.0 to 1.0, each being=to 1.0).

The following steps provide an example of one possible method for calculating the approximate densities for color A pixels, color B pixels and the color E area, in accordance with certain preferred implementations of the present invention:

A) Convert C, M, Y, and K pixel data values from an 8-bit scale of 0–255 to an equivalent scale of 0.0–1.0, then convert the pixel data to an approximate corresponding density as follows:
$D_C$1.0×C
$D_M$1.0×M
$D_K$1.5×K
$D_Y$0.125×Y B) Using the densities calculated above for C, M, Y, and K, calculate the approximate densities for color A pixels ($D_{CA}$, $D_{MA}$, $D_{YA}$, $D_{KA}$) and approximate densities for color B pixels ($D_{CB}$, $D_{MB}$, $D_{YB}$, $D_{KB}$).

C) Calculate the approximate densities for areas near edge E as being the lightest possible edge white gap that may form between colors A and B:
$D_{CE}$=min ($D_{CA}$, $D_{CB}$)
$D_{ME}$=min ($D_{MA}$, $D_{MB}$)
$D_{CE}$=min ($D_{YA}$, $D_{YB}$)
$D_{CE}$=min ($D_{KA}$, $D_{KB}$)

D) Apply formula for total approximate density:

$$D=D_K+(1.0-K)\times(1.0\times\max (D_C, D_M)+0.25\times\min (D_C, D_M)+D_Y)$$

E) Calculate total approximate densities $D_A$, $D_B$, $D_E$ using above formula.

The approximate densities that are calculated are used subsequently within the trapping process to determine the amount/type of trapping that should be applied. In most cases, it is preferred that less dense regions be extended into more dense regions in an effort to reduce the potential for gap formation between two color planes due to registration errors. Trapping can include pulling a color inward toward the identified edge, for example, by about one or more print image pixels. In certain cases, trapping will pull both colors inward, for example, each may be pulled inward by about one print image pixel or so under the other.

Figure 7:
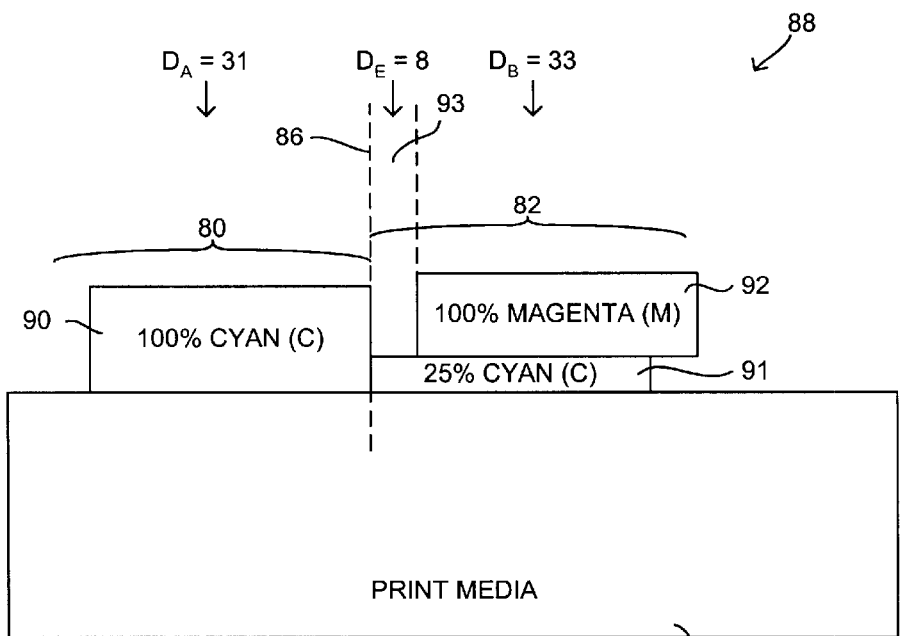
FIG. 7 is an illustrative cross-sectional view of a printed image depicting the formation of an undesirable gap between different color regions due to registration errors.

The formation of a gap due to at least one registration error is depicted in FIG. 7, wherein a cross-sectional portion 88 of an exemplary printed image is depicted. Note that portion 88 is not to scale, and is illustrative only in that the inks applied are shown in block form as being stacked upon one another and or extending outward without any underlying support.

As shown in FIG. 7, a print media 89 has been printed with cyan (C) and magenta (M) inks. In first color region 80, a 100% C ink layer 90 has been applied to print media 89 (i.e., in 8-bit CMYK terms color A is (255, 0, 0, 0)). In second color region 82, a 25% C ink layer 91 has been applied to print media 89, followed in a subsequent printing stage by a 100% M ink layer 92 (i.e., in 8-bit CMYK terms color A is (64, 255, 0, 0)).

By examining edge 86, between first color region 80 and second color region 82, it is clear that registration errors occurred sometime during the cyan (C) printing stage and the magenta (M) printing stage, as demonstrated by a gap 93 at edge 86, between C ink layer 90 and M ink layer 92. Gap 93, as shown, will have an approximate density of $D_E$=8 on a linear scale of 0–47 (i.e., 1.5×31=47). If wide enough, this lower density gap may be noticeable, especially since it falls between two higher density regions (i.e., $D_A$=31(or 0.0), and $D_E$=33(or 1.06), depending on the numbering scale employed). Thus, selected pixel 60 near edge 86 is a candidate for trapping, which will reduce the chances of gap 93 forming.

Figure 8:
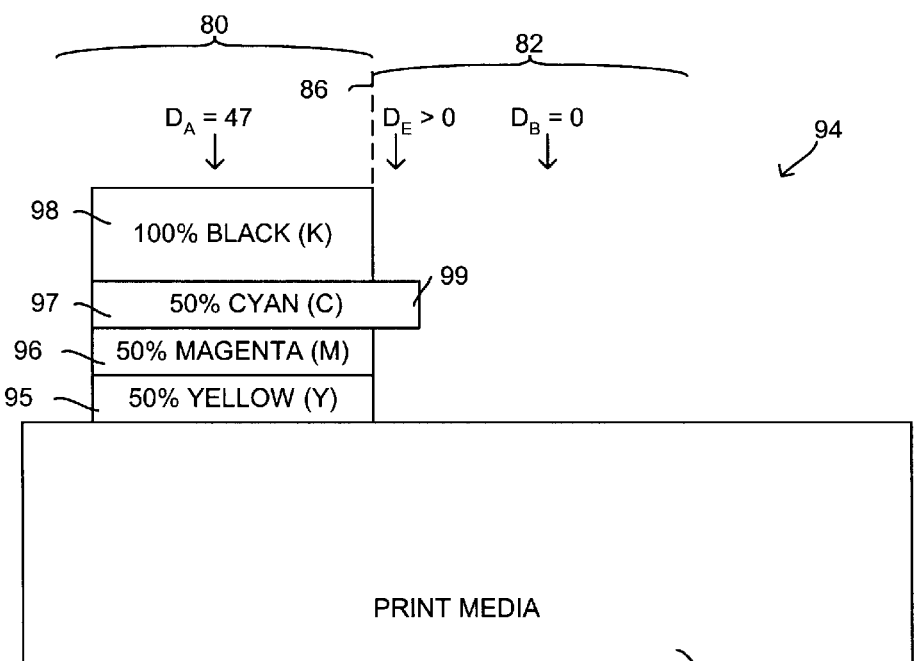
FIG. 8 is an illustrative cross-sectional view of a printed image depicting the formation of an undesirable halo effect between different color regions due to registration errors.

Having a similar depiction as FIG. 7, FIG. 8 depicts another portion 94 that illustrates how a halo effect can occur when printing images containing "process black" regions. Process black is often printed when a very dark (dense) black region is required. As shown in this example, process black is applied in first color region 80 and includes a 50% Y ink layer 95, a 50% M ink layer 96, a 50% C ink layer 97, and a 100% K ink layer 98 (i.e., in 8-bit CMYK terms color A is (128, 128, 128, 255)). The resulting approximate density for first color region 80 is therefore $D_A=47$ (or 1.5). Second color region 82 has no applied ink (i.e., in 8-bit CMYK terms color B is (0, 0, 0, 0)), and is therefore the color of print media 89. In this example, print media is assumed to be a White sheet of paper. Thus the resulting approximate density for second color region 82 is $D_B=0$. However, as depicted, registration errors occurred resulting in a misaligned portion 99 of 50% C ink layer 97, which extends slightly past edge 86 and into second color region 82. Thus, a halo effect may reduce the sharpness of the process black since it has an approximate density of $D_E>0$.

The trapping process is designed to reduce the potential impact of such registration errors and other errors, by modifying the print image pixel data values near edge 86. This is accomplished in the remaining portions of the trapping process, wherein various selected trapping parameters associated with color A pixels and color B pixels are determined and later applied.

Trapping parameters associated with color A pixels (i.e., selected pixel 60) include an override parameter ($OVRD_A$) that is multiplied by factor ($KDIF_A$), a trapping parameter ($EDGE_A$) that is multiplied by a factor (TRAP), and a yellow (Y) halo effect parameter (YHALO). Trapping parameters associated with color B pixels include an override parameter ($OVRD_B$) that is multiplied by factor ($KDIF_B$), and a trapping parameter ($EDGE_B$) that is multiplied by TRAP. As described in greater detail below, the trapping process uses the applicable trapping parameters/factors to define how much, if any, a edge movement needs to take place with regard to selected pixel 60.

The calculated values of $OVRD_A$ and $OVRD_B$ are used, as applicable, to override portions of the trapping process when there is a significantly large amount of black (K) within colors A and B respectively.

The calculated values of $EDGE_A$ and $EDGE_B$ are used, as applicable, to control the width and amount of trapping to be applied.

The calculated value of YHALO is used, as applicable, to control the amount of yellow (Y) undercutting to be applied around Green/Red objects to reduce halo effects.

Figure 10:
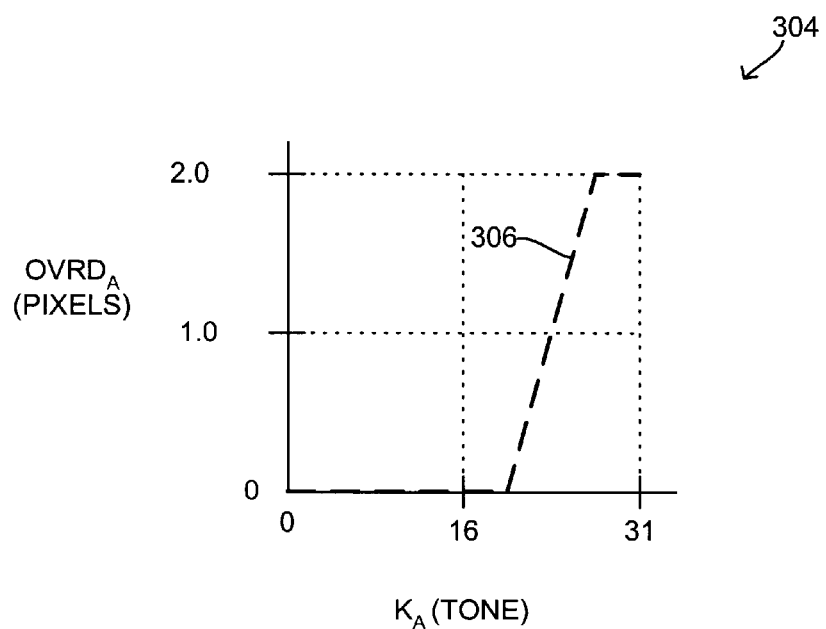
FIG. 10 is a graph depicting a function for determining a value for an $OVRD_A$ parameter for use in a trapping process.

The following list demonstrates one possible way to calculate the various parameters associated with color A pixels, in accordance with certain preferred implementations of the present invention:

A) Get an initial value of $OVRD_A$ using the function depicted in graph 304 of FIG. 10 based on value of the $K_A$ pixel data.

Figure 11:
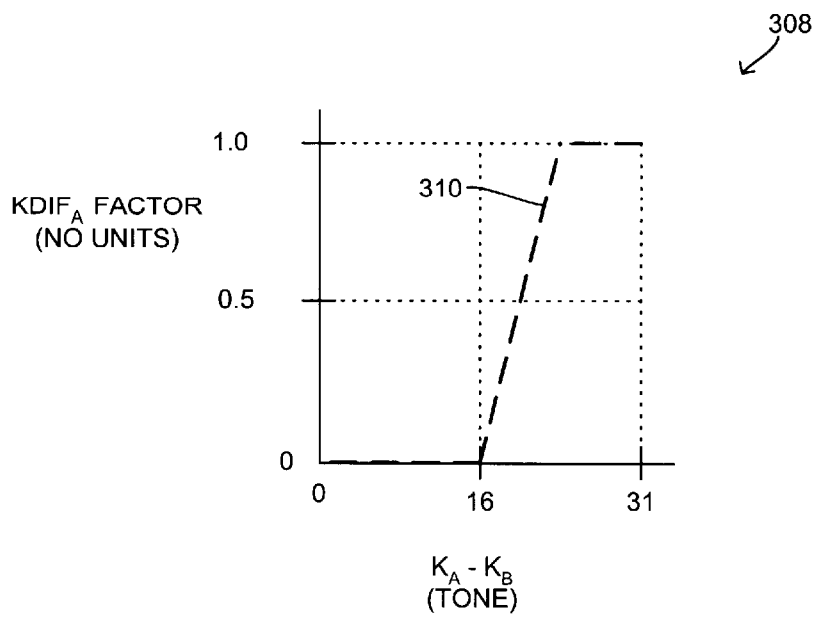
FIG. 11 is a graph depicting a function for determining a value for a $KDIF_A$ parameter for use in a trapping process.

B) Get a value of $KDIF_A$ using the function depicted in graph 308 of FIG. 11 based on the value of the $K_A$ pixel data minus value of the $K_B$ pixel data.

C) Set $OVRD_A=KDIF_A \times OVRD_A$

Figure 12:
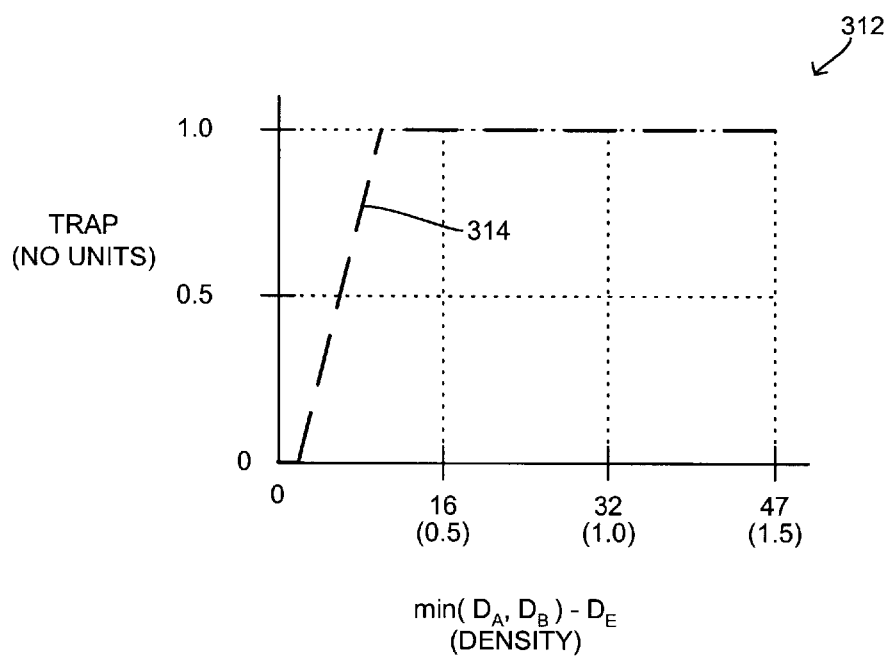
FIG. 12 is a graph depicting a function for determining a value for a TRAP parameter for use in a trapping process.

D) Get a value of TRAP using the function depicted in graph 312 of FIG. 12 based on the min $(D_A, D_B)-D_E$.

Figure 13:
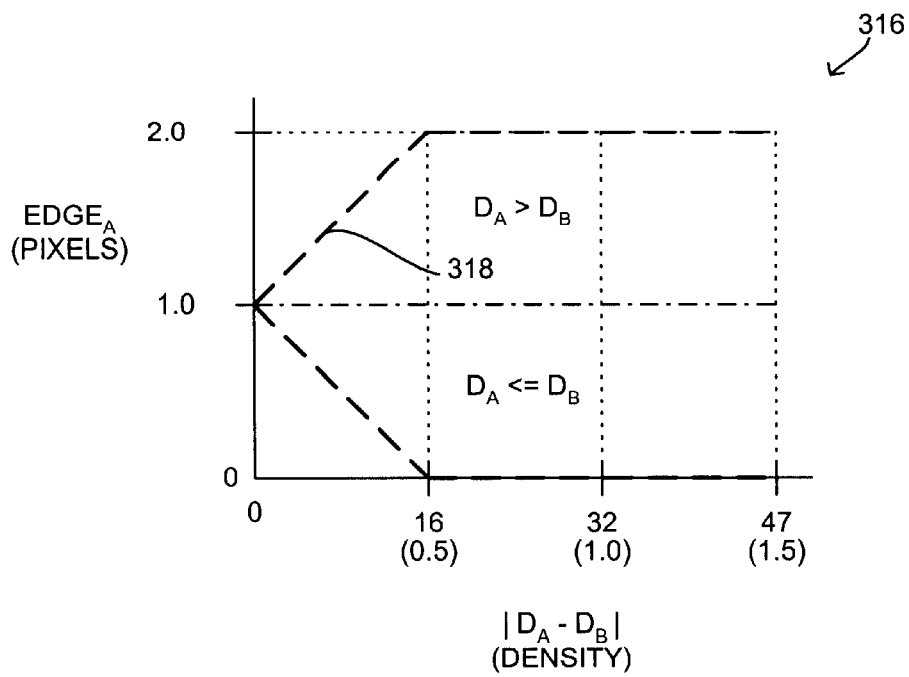
FIG. 13 is a graph depicting a function for determining a value for an $EDGE_A$ parameter for use in a trapping process.

E) Get an initial value of $EDGE_A$ using at least one of the functions depicted in graph 316 of FIG. 13 based on the $|D_A-D_B|$.

F) Set $EDGE_A=TRAP \times EDGE_A$

Figure 14:
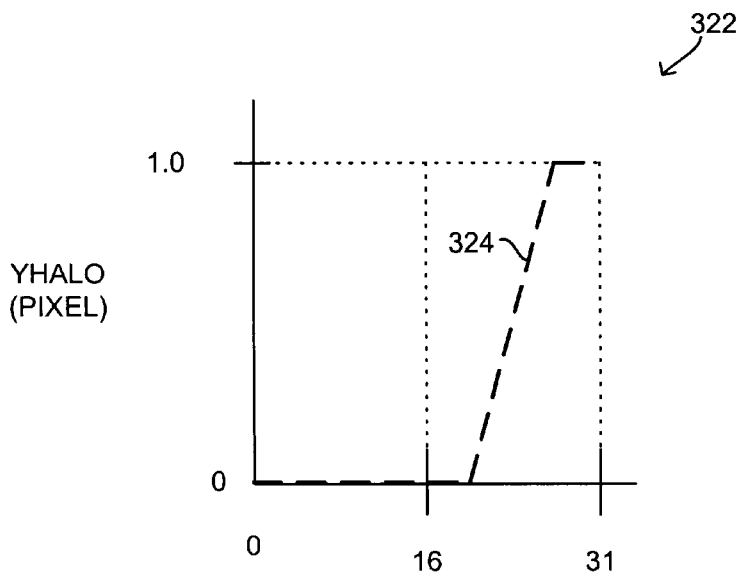
FIG. 14 is a graph depicting a function for determining a value for a YHALO parameter for use in a trapping process.

G) Get a value of YHALO using the function depicted in graph 322 of FIG. 14 based on the min $(M_A, Y_A)$–max $(M_B, Y_B)-(K_A-K_B)$.

H) IF (edge1)
{$TRAP_A$=min ($EDGE_A$, 1.0)
$OVRD_A$=min ($OVRD_A$, 1.0)
IF (edgey)
YHALO=min (YHALO, 1.0)
ELSE
YHALO=0.0}
ELSE IF (edge2)
{$TRAP_A$=max ($EDGE_A$−1.0, 1.0)
$OVRD_A$=max ($OVRD_A$−1.0, 1.0)
IF (edgey)
YHALO=max (YHALO−1.0, 1.0)
ELSE
YHALO=0.0}
ELSE
{$TRAP_A$=0.0
$OVRD_A$=0.0
YHALO=0.0}

Figure 15:
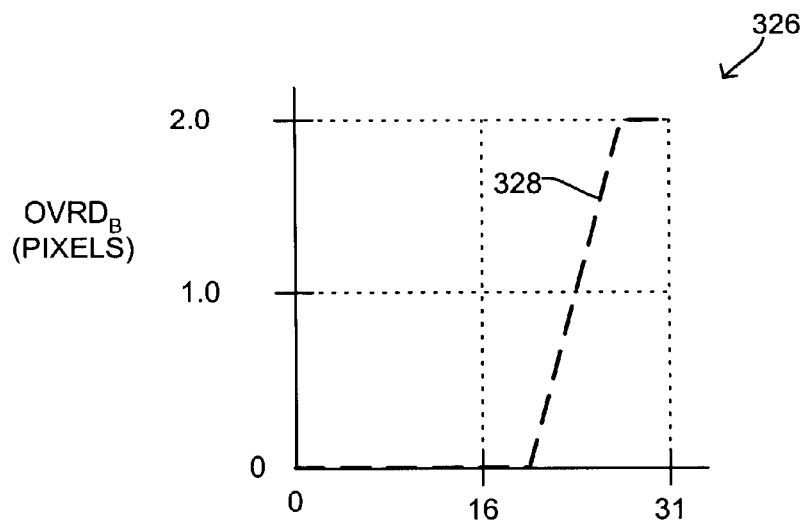
FIG. 15 is a graph depicting a function for determining a value for an $OVRD_B$ parameter for use in a trapping process.

Similarly, the following list demonstrates one possible way to calculate the various parameters associated with color B pixels, in accordance with certain preferred implementations of the present invention (here, the initial color B print image pixel data is studied to determine if later half-toning processes need to be alerted to potential changes in the color/object type of selected pixel 60):

A) Get an initial value of $OVRD_B$ using the function depicted in graph 326 of FIG. 15 based on value of the $K_B$ pixel data.

Figure 16:
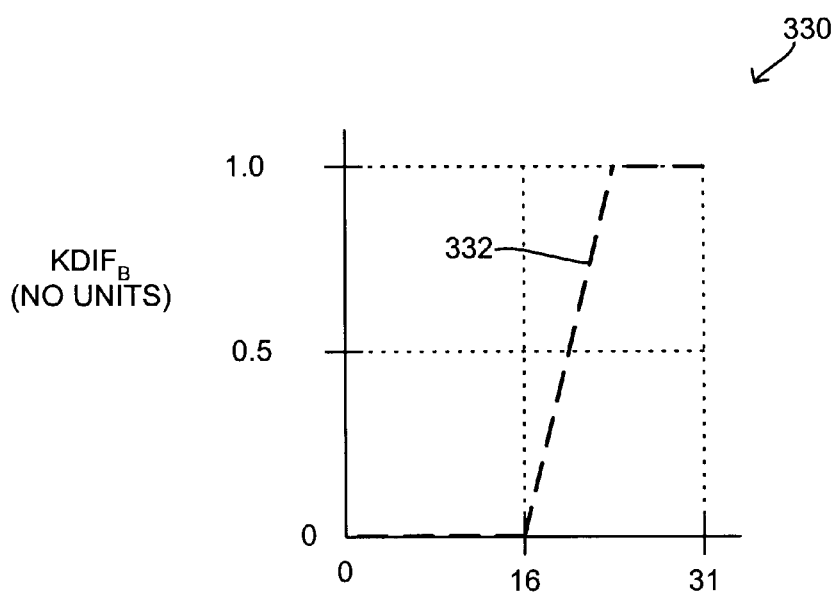
FIG. 16 is a graph depicting a function for determining a value for a $KDIF_B$ parameter for use in a trapping process.

B) Get a value of $KDIF_B$ using the function depicted in graph 330 of FIG. 16 based on the value of the $K_B$ pixel data minus value of the $K_A$ pixel data.

C) Set $OVRD_B=KDIF_B \times OVRD_B$

D) Get a value of TRAP using the function depicted in graph 312 of FIG. 12 based on the min $(D_A, D_B)-D_E$.

Figure 17:
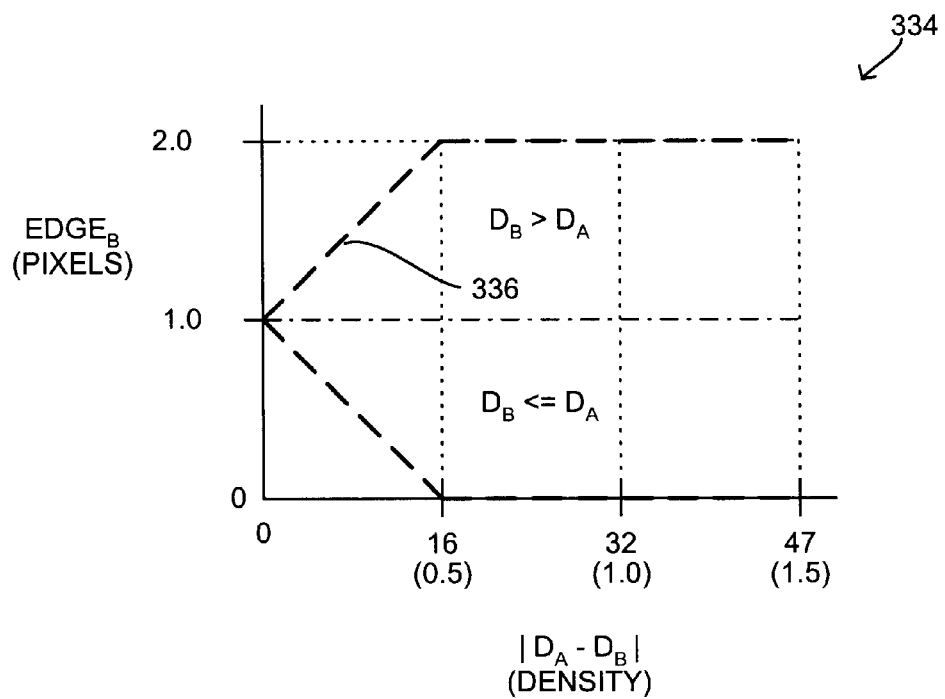
FIG. 17 is a graph depicting a function for determining a value for an $EDGE_B$ parameter for use in a trapping process.

E) Get an initial value of $EDGE_B$ using at least one of the functions depicted in graph 334 of FIG. 17 based on the $|D_A-D_B|$.

F) Set $EDGE_B=TRAP \times EDGE_B$

G) IF (edge1)
{$TRAP_B$=Min ($EDGE_B$, 1.0),
$OVRD_B$=min ($OVRD_B$, 1.0)}
ELSE IF (edge2)
{$TRAP_B$=max ($EDGE_B$−1.0, 1.0),
$OVRD_B$=max ($OVRD_B$,−1.0, 1.0)}
ELSE
{$TRAP_B$=0.0,
$OVRD_B$=0.0}

The next step in the trapping process involves selectively modifying the CMYK pixel data value of selected pixel 60 based on the various parameters calculated above. The following list demonstrates one possible way to modify the CMYK pixel data value of selected pixel 60, in accordance with certain preferred implementations of the present invention:

A) Perform step B only if trapping is enabled for this pixel based on $OT_A$ (trapping can be enabled/disabled for Text, Graphics, and Raster in application 14 by setting bits in a four-bit value "TRAPEN", for example):
IF( (TRAPEN(0)=0 AND $OT_A$=0) OR
(TRAPEN(1)=0 AND $OT_A$=1) OR
(TRAPEN(2)=0 AND $OT_A$=2) OR
(TRAPEN(3)=0 AND $OT_A$=3) ) THEN {TRAP$_A$=0, TRAP$_B$=0}
ELSE proceed to step (B)

B) Determine final TRAP$_A$ and TRAP$_B$ for the plane X being printed, wherein X=(C, M, Y, or K):
IF(X=CORM)
  {IF (X$_B$>X$_A$)
      TRAP$_A$=max (OVRD$_A$, TRAP$_A$)
      TRAP$_B$=OVRD$_B$
  ELSE
      TRAP$_A$=OVRD$_A$
      TRAP$_B$=max (OVRD$_B$, TRAP$_B$)}
ELSE IF (X=Y)
  {IF (X$_B$>X$_A$)
      TRAP$_A$=max(OVRD$_A$, TRAP$_A$)
      TRAP$_B$=0.0
  ELSE
      TRAP$_A$=max (OVRD$_A$, YHALO)
      TRAP$_B$=max (OVRD$_A$, TRAP$_B$)}
ELSE IF (X=K)
  {IF (X$_B$>X$_A$)
      TRAP$_A$=TRAP$_A$,
      TRAP$_B$=0.0
  ELSE
      TRAP$_A$=0.0
      TRAP$_B$=TAP$_B$}

C) Calculate a modified print image pixel data value for selected pixel 60 as:

$$X_O = X_A + TRAP_A \times (X_B - X_A)$$

Reference is now made to the graphs in FIGS. 10–17 that depict exemplary functions used in various steps of the trapping process as described above.

FIG. 10 depicts a graph 304 that can be used to set/determine OVRD$_A$ based on the value of the K$_A$ pixel data value of selected pixel 60. The x-axis of graph 304 depicts the tone of a 5-bit truncated value of the K$_A$ pixel data value of selected pixel 60 representing values 0 through 31. The y-axis of graph 304 depicts a value for OVRD$_A$ between 0.0 and 2.0 pixels. Line 306 is a plot of the function with respect to the x-axis and y-axis. As shown, the value of OVRD$_A$ begins to increase from 0.0 pixels at about x=20, and reaches a maximum of 2.0 pixels at about x=28. OVRD$_A$ represents the amount of pixels to pull color B in under color A at selected pixel 60 and depends on the level of blackness at selected pixel 60.

OVRD$_A$ is further modified by a factor KDIF$_A$ as depicted in a graph 308 in FIG. 11. The x-axis of graph 308 depicts the tone of a 5-bit truncated value of K$_A$–K$_B$ between 0 and 31. The y-axis of graph 308 depicts a value for KDIF$_A$ between 0.0 and 1.0. Line 310 is a plot of the function with respect to the x-axis and y-axis. As shown, the value of KDIF$_A$ begins to increase from 0.0 at about x=16, and reaches a maximum of 1.0 at about x=24. KDIF$_A$ is a control feature that is essentially used (when multiplied with OVRD$_A$) to modulate the value of OVRD$_A$. Thus, for example, KDIF$_A$ does not allow OVRD$_A$ to operate unless K$_A$ is at least 16 greater than K$_B$, and OVRD$_A$ is reduced by factor KDIF$_A$ if the difference between K$_A$ and K$_B$ is not at least 24.

FIG. 12 depicts a graph 312 that can be used to set/determine the factor TRAP based on the value of the min (D$_A$, D$_B$)–D$_E$. The x-axis of graph 312 depicts the density of min (D$_A$, D$_B$)–D$_E$, as falling between 0 through 47 (or alternatively on a scale of between 0.0 and 1.5). The y-axis of graph 312 depicts a value for TRAP between 0.0 and 1.0. Line 314 is a plot of the function with respect to the x-axis and y-axis. As shown, the value of TRAP begins to increase from 0.0 at about x=2 (or under the alternative scale at about x=0.06), and reaches a maximum of 1.0 at about x=10 (or under the alternative scale at about x=0.31). Thus, TRAP signifies that any gap formed is likely to be unnoticeable and consequently no trapping required, so long as the min (D$_A$, D$_B$)–D$_E$ is less than about 2 (or under the alternative scale is less than about 0.63). Conversely, when (D$_A$, D$_B$)–D$_E$ is greater than about 2 (or under the alternative scale is greater than about 0.06), this signifies that any gap formed is very likely to be noticed and trapping is desirable. TRAP is maximized to 1.0 allowing full trapping, when (D$_A$, D$_B$)–D$_E$ is greater than about 10 (or under the alternative scale is greater than about 0.31).

The resulting value of TRAP is used to modulate EDGE$_A$ as initially set/determined by graph 316 in FIG. 13, for example. The x-axis of graph 316 depicts the density of |D$_A$–D$_B$| between 0 and 47 (or alternatively on a scale of between 0.0 and 1.5). The y-axis of graph 316 depicts a value of EDGE$_A$ between 0.0 and 2.0 pixels. Line 318 is a plot of a function with respect to the x-axis and y-axis. As shown, when the value of |D$_A$–D$_B$| is less than 16 (or under the alternative scale is less than 0.5) and D$_A$>D$_B$, then EDGE$_A$ is between about 1.0 and about 2.0 pixels, which represents the amount that color B is pulled under color A at selected pixel 60. When the value of |D$_A$–D$_B$| is greater than 16 (or under the alternative scale is greater than 0.5) and D$_A$>D$_B$, then EDGE$_A$ equals about 2.0 pixels. When the value of D$_A$=D$_B$, then EDGE$_A$ equals about 1.0 pixels. When the value of |D$_A$–D$_B$| is less than 16 (or under the alternative scale is less than 0.5) and D$_A$<D$_B$, then EDGE$_A$ is between about 0.0 and about 1.0 pixels, which reduces the amount of movement of color B under color A. Indeed, when the value of |D$_A$–D$_B$| is greater than 16 (or under the alternative scale is greater than 0.5) and D$_A$<D$_B$, then EDGE$_A$ is equal to 0.0 and, therefore, color B is not pulled under color A at selected pixel 60.

FIG. 14 depicts graph 322 that can be used to set/determine YHALO based on the value of min (M$_A$, Y$_A$)–max (M$_B$, Y$_B$)–(K$_A$–K$_B$). The x-axis of graph 322 depicts the tone of min (M$_A$, Y$_A$)–max (M$_B$, Y$_B$)–(K$_A$–K$_B$) as falling between 0 and 31. The y-axis of graph 322 depicts a value for YHALO between 0.0 and 1.0 pixel. Line 324 is a plot of the function with respect to the x-axis and y-axis. As shown, the value of YHALO begins to increase from 0.0 pixels at about x=20, and reaches a maximum of 1.0 pixels at about x=28. YHALO represents the amount of pixels to pull color B in under color A (in the yellow plane only) at selected pixel 60 and depends on the level of Red/Green at selected pixel 60.

Graph 326 depicted in FIG. 15 is similar to graph 304 of FIG. 10, with the exception that it is used to set/determine a value for OVRD$_B$ based on the value of K$_B$. The various "B" parameters presented herein are essentially used in this example to predict what changes may be called for when the color B pixel is later designated as selected pixel 60.

With this in mind, the x-axis of graph 326 depicts the tone of a 5-bit truncated value of K$_B$ pixel data value associated with color B pixels as represented by values 0 through 31. The y-axis of graph 326 depicts a value for OVRD$_B$ between 0.0 and 2.0 pixels. Line 328 is a plot of the function with respect to the x-axis and y-axis. As shown, the value of OVRD$_B$ begins to increase from 0.0 pixels at about x=20, and reaches a maximum of 2.0 pixels at about x=28. OVRD$_B$ represents the amount of pixels to extend color A back (out) at selected pixel 60 and depends on the level of blackness of the color B pixels.

Graph 330 depicted in FIG. 16 is similar to graph 308 of FIG. 11, with the exception that it is used to set/determine a value for $KDIF_B$, which is then used to modify $OVRD_B$. The x-axis of graph 330 depicts the tone of a 5-bit truncated value of $K_B-K_A$ between 0 and 31. The y-axis of graph 330 depicts a value for $KDIF_B$ between 0.0 and 1.0. Line 332 is a plot of the function with respect to the x-axis and y-axis. As shown, the value of $KDIF_B$ begins to increase from 0.0 at about x=16, and reaches a maximum of 1.0 at about x=24. $KDIF_B$ is a control feature that is essentially used (when multiplied with $OVRD_B$) to modulate the value of $OVRD_B$. Thus, for example, $KDIF_B$ does not allow $OVRD_B$ to operate unless $K_B$ is at least 16 greater than $K_A$, and $OVRD_B$ is reduced by factor $KDIF_B$ if the difference between $K_B$ and $K_A$ is not at least 24.

Graph 334 depicted in FIG. 17 is similar to graph 316 of FIG. 13, with the exception that it is used to set/determine a value for $EDGE_B$. The x-axis of graph 334 depicts the density of $|D_A-D_B|$ between 0 and 47(or alternatively on a scale of between 0.0 and 1.5). The y-axis of graph 334 depicts a value of $EDGE_B$ between 0.0 and 2.0 pixels. Line 336 is a plot of a function with respect to the x-axis and y-axis. As shown, when the value of $|D_A-D_B|$ is less than 16 (or under the alternative scale is less than 0.5) and $D_B>D_A$, then $EDGE_B$ is between about 1.0 and about 2.0 pixels, which represents the amount that color A is pulled back at selected pixel 60. When the value of $|D_A-D_B|$ is greater than 16 (or under the alternative scale is greater than 0.5) and $D_B>D_A$, then $EDGE_B$ equals about 2.0 pixels. When the value of $D_B=D_A$, then $EDGE_B$ equals about 1.0 pixels. When the value of $|D_A-D_B|$ is less than 16 (or under the alternative scale is less than 0.5) and $D_B<D_A$, then $EDGE_B$ is between about 0.0 and about 1.0 pixels, which reduces the amount of movement of color A. Indeed, when the value of $|D_A-D_B|$ is greater than 16 (or under the alternative scale is greater than 0.5) and $D_B<D_A$, then $EDGE_B$ is equal to 0.0 and, therefore, color A is not extended out at selected pixel 60.

One of the important features in the above-described graphs, is that there is a sloping transition incorporated in each of the functions that prevents introduction of abrupt changes in the printed image due to the various trapping modifications that are made. Although depicted in the above exemplary graphs as being linear, the slopping portions of the various functions can also be nonlinear in shape. For example a curved slope may be employed to perform similar feathering capabilities. Step functions, however, are less desirable since they may introduce noticeable abrupt color changes in the printed image.

Figure 18:
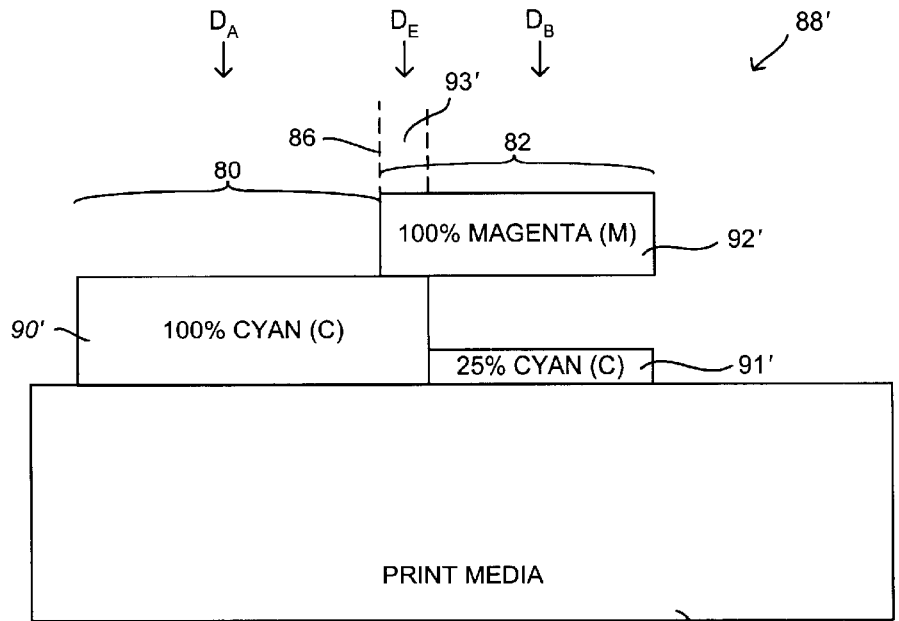
FIG. 18 is an illustrative cross-sectional view of a printed image depicting the absence of an undesirable gap between different color regions due to applied trapping techniques.

FIG. 18 is similar to FIG. 7 in that it depicts a cross-sectional portion 88' of an exemplary printed image that has been modified by the trapping process. As shown in FIG. 18, print media 89 has been printed with cyan (C) and magenta (M) inks. In first color region 80, a 100% C ink layer 90' has been applied to print media 89. In second color region 82, a 25% C ink layer 91' has been applied to print media 89, followed in a subsequent printing stage by a 100% M ink layer 92'.

Unlike portion 88 in FIG. 7, however, no gap has been formed in the region 93', because the trapping process has moved 100% C ink layer 90' over edge 86 and has also moved 100% M ink layer 92' over edge 86. This trapping overlap reduces the potential for forming a gap at edge 86. By way of example, here $D_E>D_A$ and $D_E>D_B$, which actually produces a thin blue line rather than a lighter-toned gap if no significant registration errors occur. If small registration errors do occur, then the trapping has provided an overlap that significantly reduces the potential for gap formation. In most situations, it has been found that a darker overlapping region is preferable to a lighter-toned gap.

Figure 19:
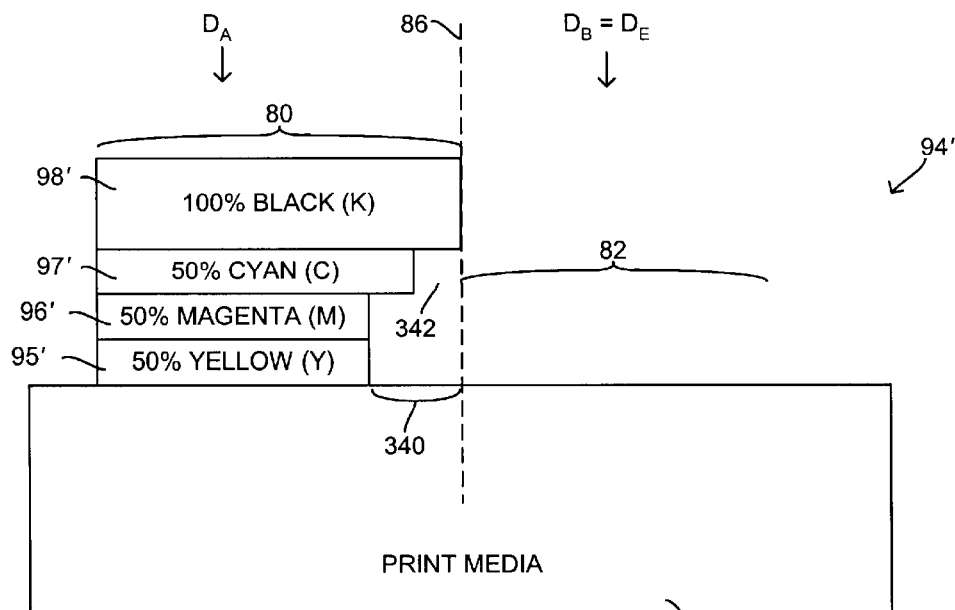
FIG. 19 is an illustrative cross-sectional view of a printed image depicting the absence of an undesirable halo effect between different color regions due to applied trapping techniques.

Portion 94' as depicted in FIG. 19 is similar to portion 94 of FIG. 8. In portion 94', however, the trapping process has pulled back a 50% Y ink layer 95' and a 50% M ink layer 96' from edge 86 by a distance 340 (e.g., about 2 pixels width), and has pulled back a 50% C ink layer 97' from edge 86 by a distance 342 (e.g., about 2 pixels width). Consequently, the trapping process has significantly reduced the potential for a halo effect occurring, for example as occurred in portion 94 of FIG. 8. Thus, in the printed image, $D_E$ will likely be approximately equal to $D_B$ and therefore no halo should be noticeable, despite the occurrence of small registration errors.

In accordance with certain further aspects of the present invention, the trapping process is not only capable of passing object type identifier data to halftoner unit 26 (e.g., see trapping unit 24 in FIG. 1), but can also set a halftone flag ($FLAG_{AHT}$) and modify the object type identifier data ($OT_O$) associated with selected pixel 60.

For example, the following list demonstrates one possible way that this can be accomplished:

A) $FLAG_{AHT}$, is set when selected pixel is modified by the trapping process and/or when color B would be modified. Here, when the flag is set, half toning is modified.

IF (((edge1 AND AHTFLAG(0)=1) OR (edge2=1 AND

AHTFLAG(1)=1)) AND ($TRAP_A>0$ OR $TRAP_B>0$ OR

AHTFLAG(2)=1)) THEN

{$FLAG_{AHT}=1$}

ELSE

{$FLAG_{AHT}=0$}

B) Set object type for selected pixel 60. Here, if significant changes occurred to selected pixel 60, then it may be necessary to change the object type to avoid undesirable half toning or other post trapping process problems.

IF ($TRAP_A>0.5$) THEN

{$OT_O=OT_B$}

ELSE

{$OT_O=OT_A$}

As described above, the various exemplary methods and arrangements in accordance with the present invention provide advanced trapping techniques that selectively modify the print image data prior to printing. The trapping techniques can be configured to operate automatically without significant user inputs and can be readily applied to all types of printable images regardless of origin. The trapping process is applied to print image data, wherein it detects edges between different color regions that are susceptible to gap/halo formation due to registration errors. The trapping process then selectively modifies the print image data associated with the color regions near the edge to provide an overlap of color planes that significantly reduces the potential for gap/halo formation in the subsequently printed image. The trapping process can be included in a variety of computing/printing devices and/or applications that could benefit from such techniques.

Thus, although some preferred implementations of the various methods and arrangements of the present invention have been illustrated in the accompanying Drawings and described in the foregoing Detailed Description, it will be understood that the invention is not limited to the exemplary aspects disclosed, but is capable of numerous rearrangements, modifications and substitutions without departing from the spirit of the invention as set forth and defined by the following claims.

What is claimed is:

1. A trapping method comprising:
   buffering print image data representing an array of pixels including a selected pixel of a first color and a second pixel of a second color that is different than the first color;
   categorizing at least a portion of the print image data by defining a first color category subset of pixels having print image data that fall within a threshold range of the first color, and at least a second color category subset of pixels having print image data that fall within a threshold range of the second color;
   determining when an edge is represented in the print image data by comparing an arrangement within the pixel array of first color category subset of pixels and at least the second color category subset of pixels; and
   selectively modifying print image data for at least the selected pixel to provide trapping, if located near the edge, wherein the modification is based on a difference in color between the second and first colors and a trapping parameter derived by comparing a density of the first color with a density of the second color.

2. The trapping method as recited in claim 1, wherein:
   buffering the print image data further comprises buffering at least cyan (C) image data, magenta (M) image data, yellow (Y) image data, and black (K) image data.

3. The trapping method as recited in claim 2, wherein selectively modifying print image data further comprises selectively modifying at least one print image data value selected from a group including cyan (C) image data, magenta (M) image data, yellow (Y) image data, and black (K) image data associated with the selected pixel.

4. The method as recited in claim 1, further comprising, performing the trapping method for each of a plurality of different color plane printing stages.

5. The trapping method as recited in claim 1, wherein selectively modifying print image data further comprises modifying the print image data associated with the selected pixel based on the following formula:

$$X_O = X_A + TRAP_A \times (X_B - X_A),$$

wherein, $TRAPA$ is the trapping parameter for the first color, $X_O$ is a modified print image data value for the selected pixel, $X_A$ is a print image data value for the selected pixel, and $X_B$ is a print image data value for the second pixel.

6. The trapping method as recited in claim 1, further comprising printing the selectively modified print image data to a print media using at least one ink.

7. An apparatus for use with at least one computer that outputs color image data depicting a first color region and an adjacent second color region having at least one edge formed there between, the apparatus comprising:
   a converting unit configured to receive the color image data and output corresponding print image data; and
   a trapping unit configured to receive the print image data and buffer an array of pixels including a selected pixel of a first color and a second pixel of a second color that is different than the first color, categorize at least a portion of the print image data by defining a first color category subset of pixels having print image data that fall within a threshold range of the first color and at least a second color category subset of pixels having print image data that fall within a threshold range of the second color, determine when an edge is represented in the print image data comparing an arrangement within the pixel array of first color category subset of pixels and at least the second color category subset of pixels, and selectively modify print image data for at least the selected pixel to provide trapping, if located near the edge, wherein the modification is based on a difference in color between the second and first colors and a trapping parameter derived by comparing a density of the first color with a density of the second color.

8. The apparatus as recited in claim 7, wherein the trapping unit is configured to store at least cyan (C) image data, magenta (M) image data, yellow (Y) image data, and black (K) image data.

9. The apparatus as recited in claim 8, wherein the trapping unit is further configured to provide trapping for each of a plurality of different color plane printing stages.

10. The apparatus as recited in claim 7, wherein the trapping unit is further configured to selectively modify print image data associated with the selected pixel based on the following formula:

$$X_O = X_A + TRAP_A \times (X_B - X_A),$$

wherein, $TRAP_A$ is the trapping parameter for the first color, $X_O$ is a modified print image data value for the selected pixel, $X_A$ is a print image data value for the selected pixel, and $X_B$ is a print image data value for the second pixel.

11. The apparatus as recited in claim 7, wherein the converting unit and the trapping unit are each part of a color printing device.

12. A system comprising:
    at least one computer configured to output color image data; and
    a color printer connected to the computer and configured to receive the color image data and output a corresponding printed image, the color printer including:
      a converting unit configured to receive color image data and output corresponding print image data;
      a trapping unit configured to receive the print image data and buffer an array of pixels including a selected pixel of a first color and a second pixel of a second color that is different than the first color, categorize at least a portion of the print image data by defining a first color category subset of pixels having print image data that fall within a threshold range of the first color and at least a second color category subset of pixels having print image data that fall within a threshold range of the second color, determine when an edge is represented in the print image data comparing an arrangement within the pixel array of first color category subset of pixels and at least the second color category subset of pixels, and selectively modify print image data for at least the selected pixel to provide trapping, if located near the edge, wherein the modification is based on a difference in color between the second and first colors and a trapping parameter derived by comparing a density of the first color with a density of the second color; and
      a printing unit configured to receive the modified print image data and selectively apply at least one ink to a print media based on the modified print image data.

13. The system as recited in claim 12, wherein the trapping unit is configured to store at least cyan (C) image data, magenta (M) image data, yellow (Y) image data, and black (K) image data.

14. The system as recited in claim 12, wherein the trapping unit is further configured to selectively modify print image data associated with the selected pixel based on the following formula:

$$X_O = X_A + TRAP_A \times (X_B - X_A),$$

wherein, $TRAP_A$ is the trapping parameter for the first color, $X_O$ is a modified print image data value for the selected pixel, $X_A$ is a print image data value for the selected pixel, and $X_B$ is a print image data value for the second pixel.

* * * * *